United States Patent
Lim et al.

(10) Patent No.: US 11,849,452 B2
(45) Date of Patent: Dec. 19, 2023

(54) CONFIGURATION OF SIGNAL FIELD COMPRISING INFORMATION RELATED TO TRANSMISSION MODE

(71) Applicant: LG Electronics Inc., Seoul (KR)

(72) Inventors: Dongguk Lim, Seoul (KR); Jinyoung Chun, Seoul (KR); Jinsoo Choi, Seoul (KR); Eunsung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 204 days.

(21) Appl. No.: 17/356,866

(22) Filed: Jun. 24, 2021

(65) Prior Publication Data

US 2021/0410131 A1    Dec. 30, 2021

(30) Foreign Application Priority Data

Jun. 24, 2020  (KR) .................. 10-2020-0077245
Sep. 17, 2020  (KR) .................. 10-2020-0119957
Sep. 22, 2020  (KR) .................. 10-2020-0122422

(51) Int. Cl.
| | |
|---|---|
| H04W 72/04 | (2023.01) |
| H04L 1/18 | (2023.01) |
| H04B 7/0452 | (2017.01) |
| H04W 72/20 | (2023.01) |
| H04L 1/1812 | (2023.01) |
| H04W 84/12 | (2009.01) |

(52) U.S. Cl.
CPC .......... *H04W 72/20* (2023.01); *H04B 7/0452* (2013.01); *H04L 1/1812* (2013.01); *H04W 84/12* (2013.01)

(58) Field of Classification Search
CPC ... H04W 28/04; H04W 72/04; H04W 72/042; H04W 88/08; H04W 72/0406; H04W 72/20; H04W 84/12; H04L 5/0007; H04L 1/1812; H04B 7/0452
USPC ........................................................ 370/329
See application file for complete search history.

(56) References Cited

U.S. PATENT DOCUMENTS

| | | | | |
|---|---|---|---|---|
| 10,448,378 | B2* | 10/2019 | Seok ..................... | H04L 1/0025 |
| 2005/0201325 | A1* | 9/2005 | Kang .................. | H04L 27/2602 |
| | | | | 370/208 |
| 2012/0051312 | A1* | 3/2012 | Noh ...................... | H04W 72/30 |
| | | | | 370/329 |
| 2015/0063288 | A1* | 3/2015 | Yang ..................... | H04L 27/262 |
| | | | | 370/329 |
| 2016/0021682 | A1* | 1/2016 | Wang .................. | H04W 40/244 |
| | | | | 370/329 |

(Continued)

FOREIGN PATENT DOCUMENTS

| | | | | |
|---|---|---|---|---|
| WO | WO 2021/141530 A1 * | 7/2021 | ............... | H04L 5/00 |
| WO | WO 2021/184024 A1 * | 9/2021 | ............... | H04L 5/00 |

*Primary Examiner* — Peter G Solinsky
*Assistant Examiner* — Sanjay K Dewan
(74) *Attorney, Agent, or Firm* — Fish & Richardson P.C.

(57) ABSTRACT

The present disclosure proposes an example related to the signal field of the wireless LAN system. For example, a transmission/reception physical protocol data unit (PPDU) includes a first control signal field, and the first control signal field includes information related to a plurality of transmission modes which are related to SU, OFDMA, full bandwidth MU-MIMO, NDP, etc. The second control signal field of the transmission/reception PPDU may include various common fields and user specific fields configured based on a transmission mode.

8 Claims, 25 Drawing Sheets

(56) References Cited

U.S. PATENT DOCUMENTS

| | | | |
|---|---|---|---|
| 2016/0143026 A1* | 5/2016 | Seok | H04L 1/0025 |
| | | | 370/329 |
| 2016/0150514 A1* | 5/2016 | Kwon | H04W 74/0816 |
| | | | 370/329 |
| 2016/0156396 A1* | 6/2016 | Stacey | H04W 8/186 |
| | | | 370/329 |
| 2016/0165589 A1* | 6/2016 | Chu | H04W 72/21 |
| | | | 370/329 |
| 2016/0191127 A1* | 6/2016 | Zhang | H04B 7/0452 |
| | | | 370/329 |
| 2016/0192351 A1* | 6/2016 | Kwon | H04L 5/0007 |
| | | | 370/329 |
| 2016/0205686 A1* | 7/2016 | Kim | H04W 56/002 |
| | | | 370/329 |
| 2016/0254884 A1* | 9/2016 | Hedayat | H04B 7/0628 |
| | | | 370/329 |
| 2017/0048844 A1* | 2/2017 | Chen | H04W 72/21 |
| 2018/0020367 A1* | 1/2018 | Hsu | H04W 72/52 |
| 2019/0149293 A1* | 5/2019 | Suh | H04L 27/2602 |
| | | | 370/329 |
| 2020/0015234 A1* | 1/2020 | Li | H04W 74/04 |
| 2021/0258116 A1* | 8/2021 | Chen | H04L 27/2602 |
| 2021/0266204 A1* | 8/2021 | Chen | H04L 25/03866 |
| 2021/0273757 A1* | 9/2021 | Shellhammer | H04W 72/0446 |
| 2021/0288768 A1* | 9/2021 | Yang | H04L 5/0044 |
| 2021/0289500 A1* | 9/2021 | Yang | H04W 72/0453 |
| 2021/0297209 A1* | 9/2021 | Shellhammer | H04W 72/23 |
| 2022/0141871 A1* | 5/2022 | Abouelseoud | H04B 7/0452 |
| | | | 370/329 |

\* cited by examiner

FIG. 1
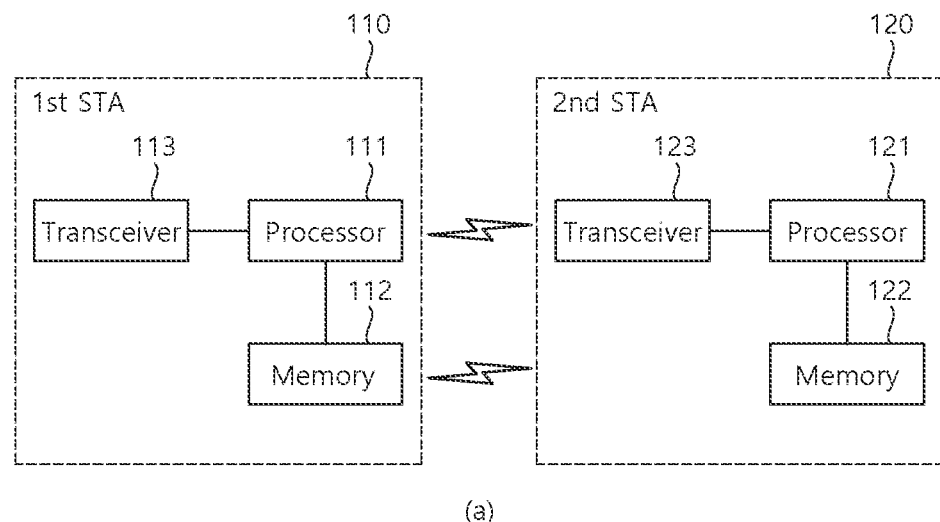
(a)
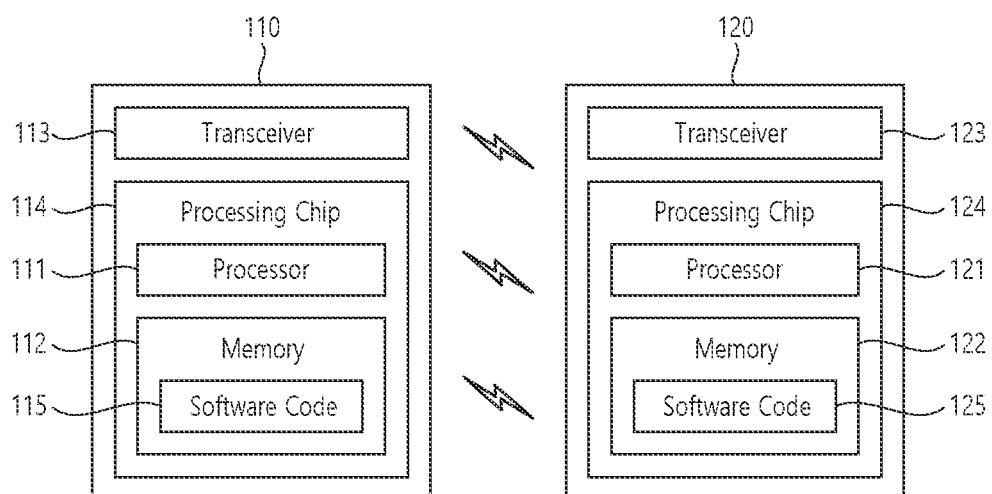
(b)

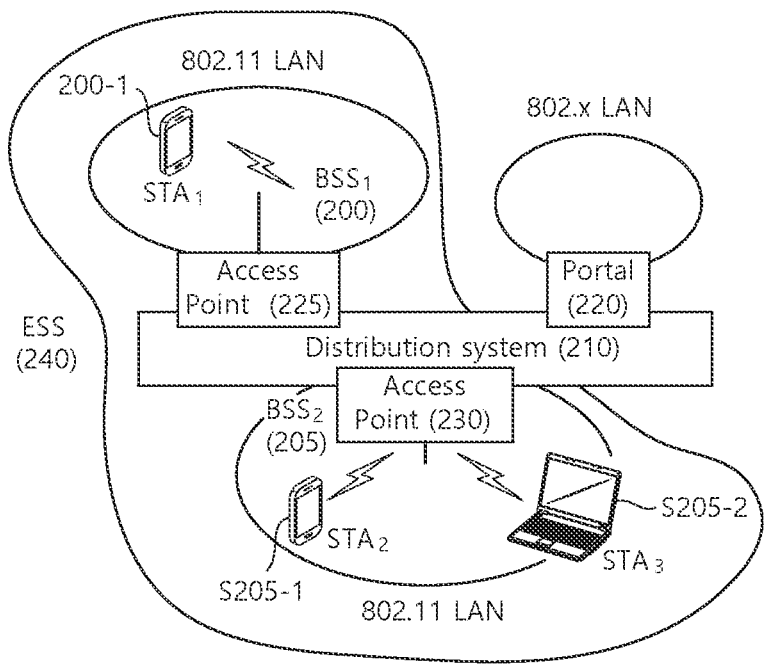
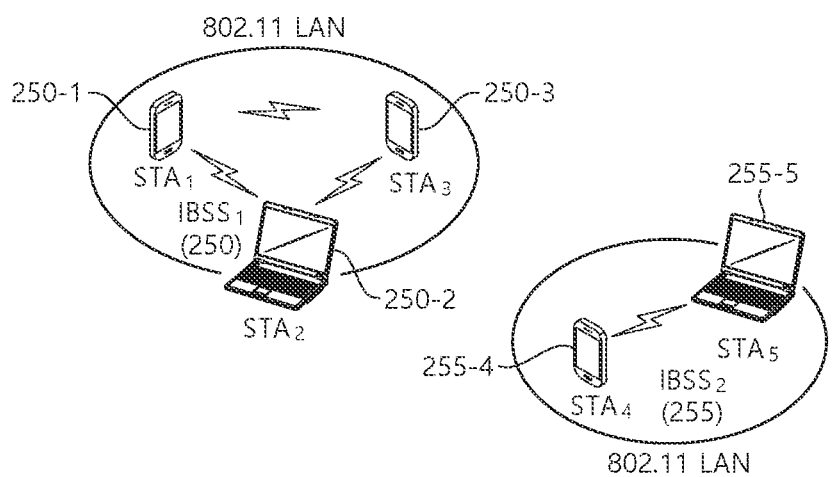

FIG. 3
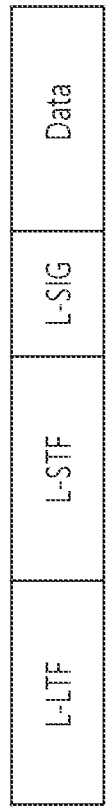
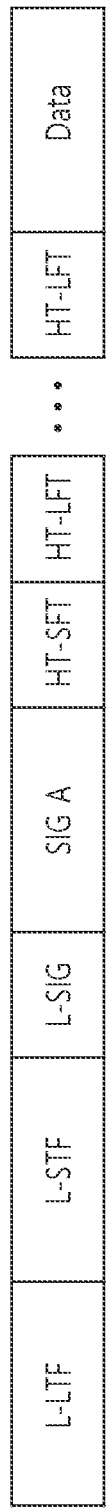
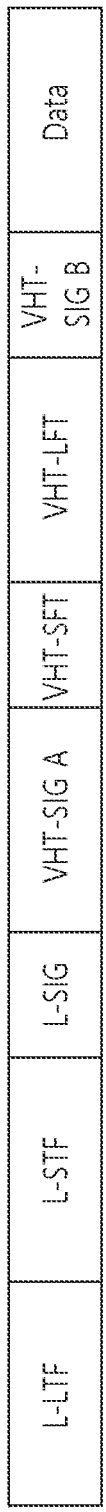
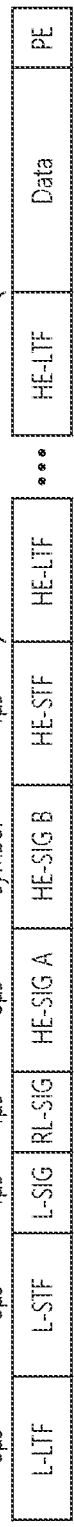

| Version independent field (1910) | Version dependent field (1920) |
|---|---|

CONFIGURATION OF SIGNAL FIELD COMPRISING INFORMATION RELATED TO TRANSMISSION MODE

CROSS-REFERENCE TO RELATED APPLICATIONS

Pursuant to 35 U.S.C. § 119 (a), this application claims the benefit of Korean Patent Application Nos. 10-2020-0077245 filed on Jun. 24, 2020, 10-2020-0119957 filed on Sep. 17, 2020, and 10-2020-0122422 filed on Sep. 22, 2020, the contents of which are all hereby incorporated by reference herein in their entirety.

BACKGROUND

Technical Field

The present specification relates to a signal field of a wireless LAN system, and more specifically, to a configuration of a signal field including information related to various transmission modes in a wireless LAN system.

Description of the Related Art

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

In order to support a high throughput and a high data rate, the EHT standard may use a wide bandwidth (e.g., 160/320 MHz), 16 streams, and/or a multi-link (or multi-band) operation or the like.

In the EHT standard, a wide bandwidth (e.g., 160/240/320 MHz) may be used for high throughput. Also, in order to efficiently use the bandwidth, preamble puncturing and multiple RU transmission may be used.

Compared to the related art, the EHT standard may support various transmission modes. In this case, various transmission/reception techniques are required to support various transmission modes.

SUMMARY

Technical Objects

In the EHT standard, a Multi-User Physical Protocol Data Unit (MU-PPDU) for multi-user (MU) communication and a Trigger-based (TB) PPDU for Uplink MU communication may be defined. In this case, various transmission modes should be supported through the MU PPDU. For example, SU, OFDMA, full bandwidth MU-MIMO, NDP mode should be supported.

In order to support various modes as described above, a transmission/reception scheme indicating various modes should be designed.

Technical Solutions

The present specification proposes technical features regarding a transmission method, a reception method, a transmitting station (STA), a receiving STA, etc. in the WLAN.

For example, the receiving STA may receive a receiving physical protocol data unit (PPDU).

For example, the reception PPDU may include a first control signal field for interpreting the reception PPDU, a second control signal field including additional control information for the reception PPDU, and a data field.

For example, the first control signal field may include a type field having 2-bit information about the type of the received PPDU.

For example, the receiving STA may determine the type of the receiving PPDU based on the type field.

An example of the present specification proposes a transmission/reception technique for indicating various modes through a control field. Through this, an example of the present specification can effectively indicate information related to SU, OFDMA, full bandwidth MU-MIMO, NDP, and the like.

BRIEF DESCRIPTION OF THE DRAWINGS

FIG. 1 shows an example of a transmitting apparatus and/or receiving apparatus of the present specification.

FIG. 2 is a conceptual view illustrating the structure of a wireless local area network (WLAN).

FIG. 3 illustrates an example of a PPDU used in an IEEE standard.

FIG. 19 shows an example of a first control signal field or U-SIG field of the present specification.

DESCRIPTION OF EXEMPLARY EMBODIMENTS

Figure 4:
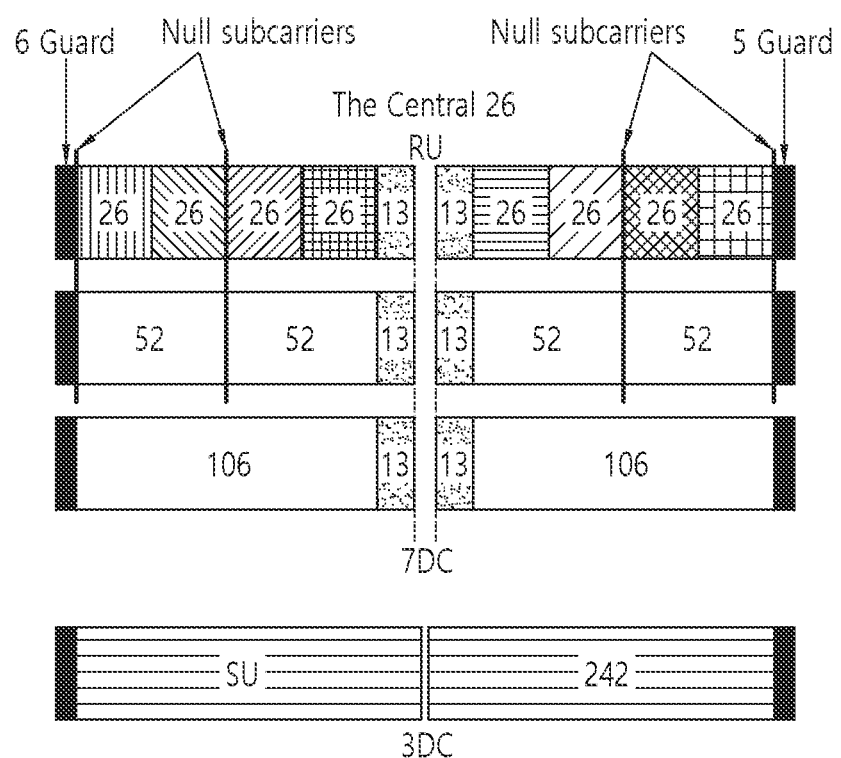
FIG. 4 illustrates a layout of resource units (RUs) used in a band of 20 MHz.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP. In the present specification, the AP may be indicated as an AP STA.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, an STA1, an STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a subfield (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and an STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates an example of a PPDU used in an IEEE standard.

As illustrated in FIG. 3, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 3 also includes an example of an HE PPDU according to IEEE 802.11ax. The HE PPDU according to FIG. 3 is an illustrative PPDU for multiple users. An HE-SIG-B may be included only in a PPDU for multiple users, and an HE-SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

FIG. 4 illustrates a layout of resource units (RUs) used in a band of 20 MHz.

As illustrated in FIG. 4, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 4, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 4 may be used not only for a multiple users (MUs) but also for a single user (SU), in which case one 242-unit may be used and three DC tones may be inserted as illustrated in the lowermost part of FIG. 4.

Although FIG. 4 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 5:
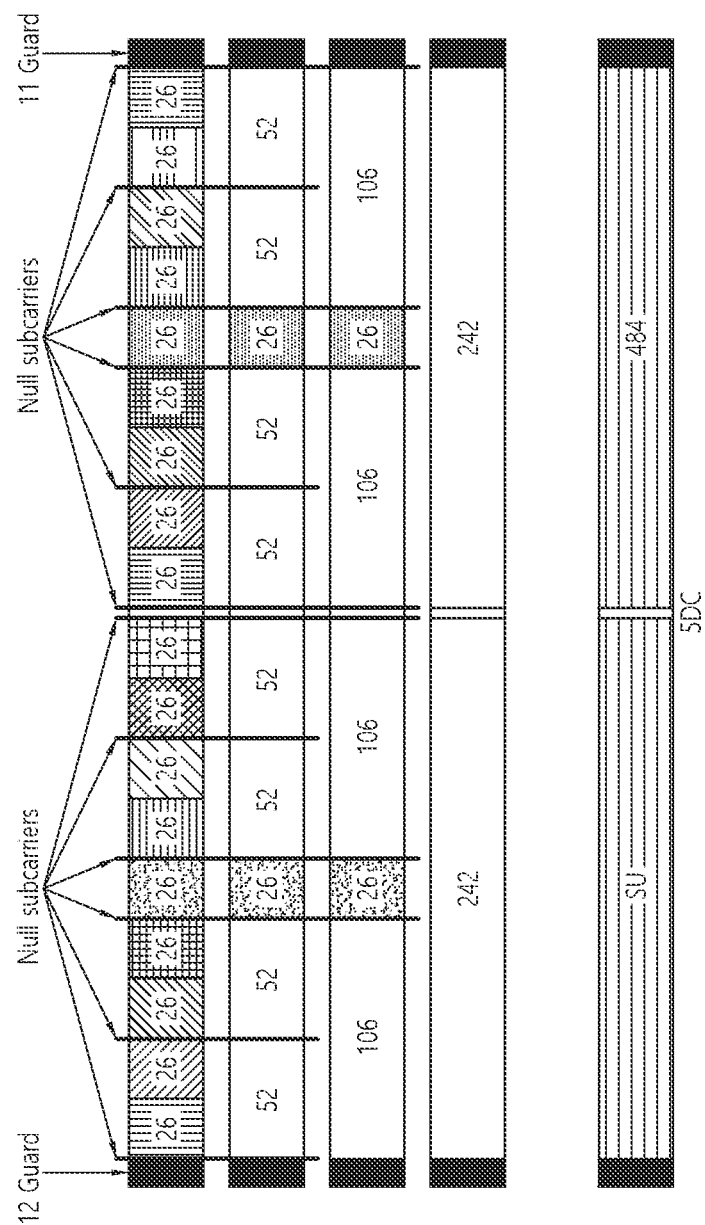
FIG. 5 illustrates a layout of RUs used in a band of 40 MHz.

FIG. 5 illustrates a layout of RUs used in a band of 40 MHz.

Similar to FIG. 4 in which RUs having various sizes are used, a 26-RU, a 52-RU, a 106-RU, a 242-RU, a 484-RU, and the like may be used in an example of FIG. 5. Further, five DC tones may be inserted in a center frequency, 12 tones may be used for a guard band in the leftmost band of the 40 MHz band, and 11 tones may be used for a guard band in the rightmost band of the 40 MHz band.

As illustrated, when the layout of the RUs is used for a single user, a 484-RU may be used. The specific number of RUs may be changed similar to FIG. 5.

Figure 6:
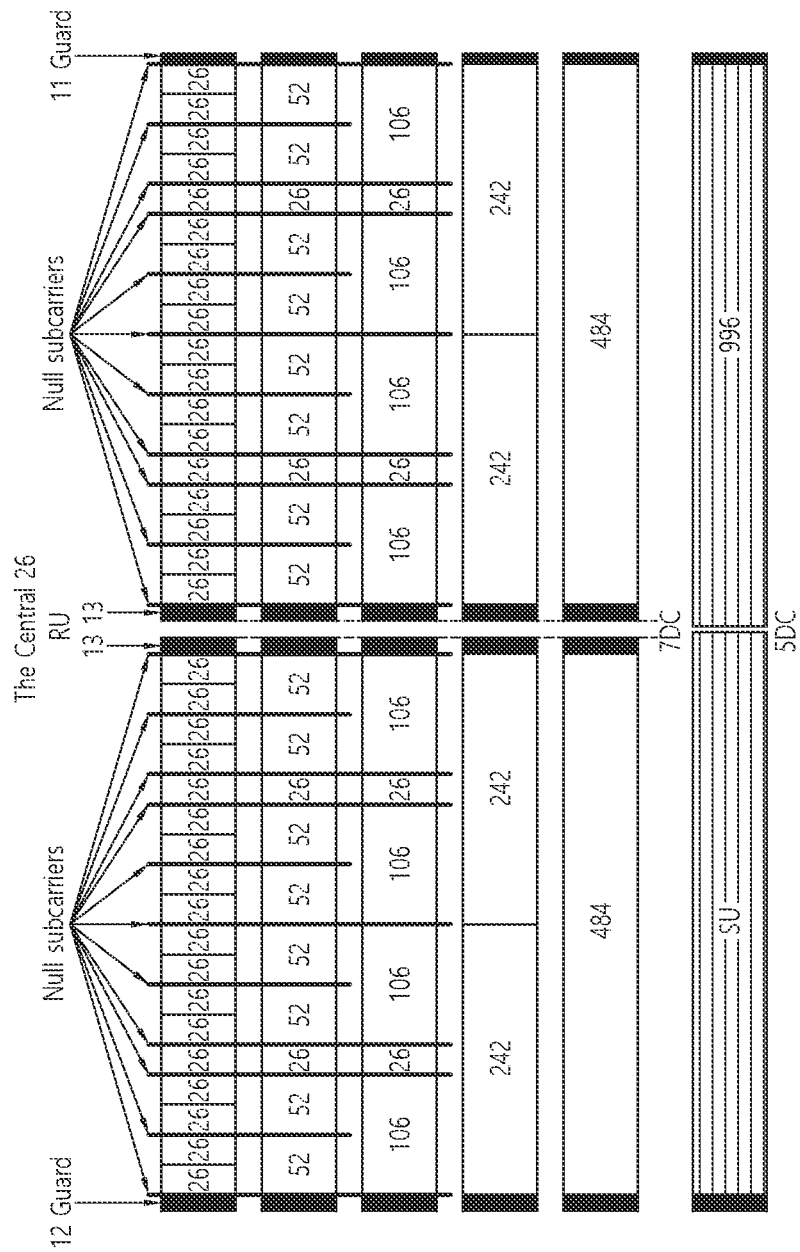
FIG. 6 illustrates a layout of RUs used in a band of 80 MHz.

FIG. 6 illustrates a layout of RUs used in a band of 80 MHz.

Similar to FIG. 4 and FIG. 5 in which RUs having various sizes are used, a 26-RU, a 52-RU, a 106-RU, a 242-RU, a 484-RU, a 996-RU, and the like may be used in an example of FIG. 6. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 7:
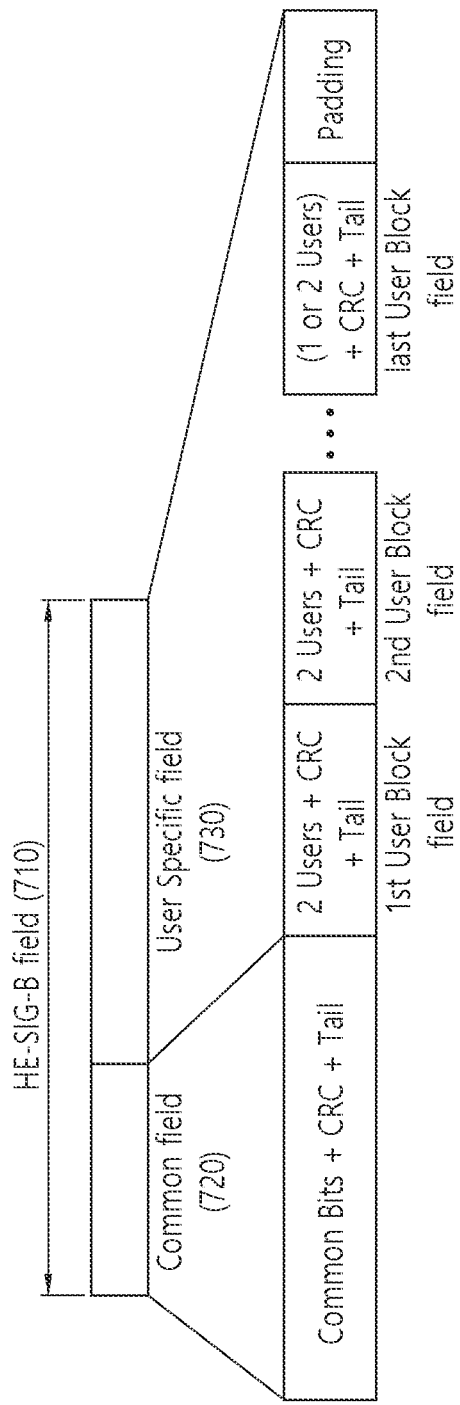
FIG. 7 illustrates a structure of an HE-SIG-B field.

FIG. 7 illustrates a structure of an HE-SIG-B field.

As illustrated, an HE-SIG-B field 710 includes a common field 720 and a user-specific field 730. The common field 720 may include information commonly applied to all users (i.e., user STAs) which receive SIG-B. The user-specific field 730 may be called a user-specific control field. When the SIG-B is transferred to a plurality of users, the user-specific field 730 may be applied only any one of the plurality of users.

As illustrated, the common field 720 and the user-specific field 730 may be separately encoded.

The common field 720 may include RU allocation information of N*8 bits. For example, the RU allocation information may include information related to a location of an RU. For example, when a 20 MHz channel is used as shown in FIG. 4, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |

As shown the example of FIG. 4, up to nine 26-RUs may be allocated to the 20 MHz channel. When the RU allocation information of the common field 720 is set to "00000000" as shown in Table 1, the nine 26-RUs may be allocated to a corresponding channel (i.e., 20 MHz). In addition, when the RU allocation information of the common field 720 is set to "00000001" as shown in Table 1, seven 26-RUs and one 52-RU are arranged in a corresponding channel. That is, in the example of FIG. 4, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | | | 106 | | | 26 | 26 | 26 | 26 | 26 | 8 |
| 01001$y_2y_1y_0$ | | | 106 | | | 26 | 26 | 26 | 52 | | 8 |

"01000y2y1y0" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information (y2y1y0). For example, when the 3-bit information (y2y1y0) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 7, the user-specific field 730 may include a plurality of user fields. As described above, the number of STAs (e.g., user STAs) allocated to a specific channel may be determined based on the RU allocation information of the common field 720. For example, when the RU allocation information of the common field 720 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 8.

a result, since eight user STAs are allocated, the user-specific field 730 of HE-SIG-B may include eight user fields.

Figure 9:
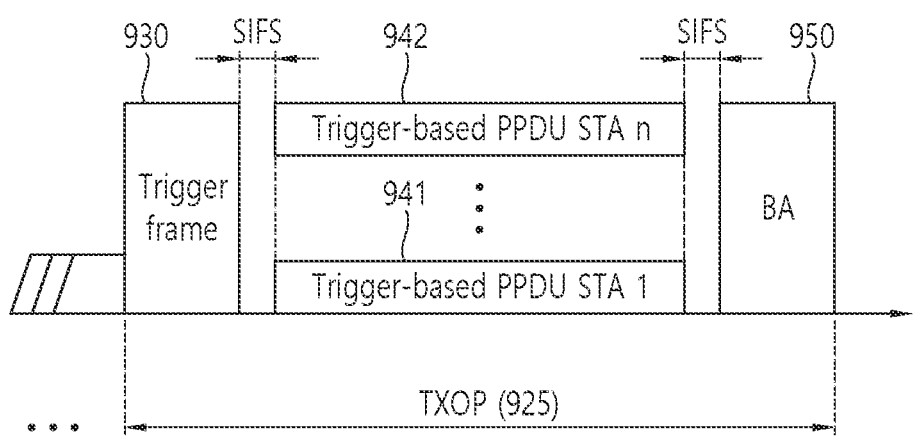
FIG. 9 illustrates an operation based on UL-MU.

The eight user fields may be expressed in the order shown in FIG. 9. In addition, as shown in FIG. 7, two user fields may be implemented with one user block field.

Figure 8:
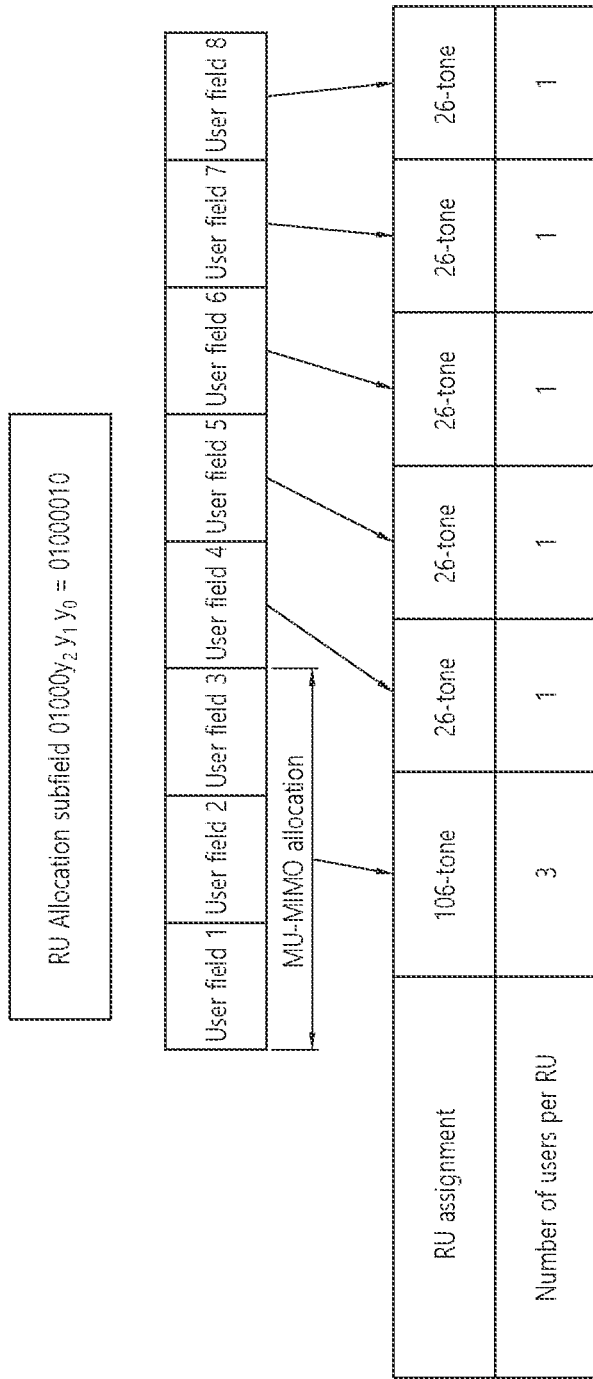
FIG. 8 illustrates an example in which a plurality of user STAs are allocated to the same RU through a MU-MIMO scheme.

The user fields shown in FIG. 7 and FIG. 8 may be configured based on two formats. That is, a user field related to a MU-MIMO scheme may be configured in a first format, and a user field related to a non-MIMO scheme may be configured in a second format. Referring to the example of FIG. 8, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3 ... B0 | $N_{STS}$[1] | $N_{STS}$[2] | $N_{STS}$[3] | $N_{STS}$[4] | $N_{STS}$[5] | $N_{STS}$[6] | $N_{STS}$[7] | $N_{STS}$[8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1100 | 3 | 3 | 2 | | | | | | 8 | |
| 4 | 0000-0011 | 1-4 | 1 | 1 | 1 | | | | | 4-7 | 11 |
|   | 0100-0110 | 2-4 | 2 | 1 | 1 | | | | | 6-8 | |
|   | 0111 | 3 | 3 | 1 | 1 | | | | | 8 | |
|   | 1000-1001 | 2-3 | 2 | 2 | 1 | | | | | 7-8 | |
|   | 1010 | 2 | 2 | 2 | 2 | | | | | 8 | |

TABLE 4

| $N_{user}$ | B3 ... B0 | $N_{STS}$[1] | $N_{STS}$[2] | $N_{STS}$[3] | $N_{STS}$[4] | $N_{STS}$[5] | $N_{STS}$[6] | $N_{STS}$[7] | $N_{STS}$[8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 | |
|   | 0110 | 2 | 2 | 2 | 1 | 1 | | | | 8 | |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

FIG. 8 illustrates an example in which a plurality of user STAs are allocated to the same RU through a MU-MIMO scheme.

For example, when RU allocation is set to "01000010" as shown in FIG. 7, a 106-RU may be allocated to the leftmost side of a specific channel, and five 26-RUs may be allocated to the right side thereof. In addition, three user STAs may be allocated to the 106-RU through the MU-MIMO scheme. As As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 8, N user is set to "3". Therefore, values of N_STS[1], N_STS[2], and N_STS [3] may be determined as shown in Table 3. For example, when a value of the second bit (B11-B14) is "0011", it may be set to N_STS[1]=4, N_STS[2]=1, N_STS[3]=1. That is, in the example of FIG. 8, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

FIG. 9 illustrates an operation based on UL-MU. As illustrated, a transmitting STA (e.g., AP) may perform channel access through contending (e.g., a backoff operation), and may transmit a trigger frame 930. That is, the transmitting STA may transmit a PPDU including the trigger frame 930. Upon receiving the PPDU including the trigger frame, a trigger-based (TB) PPDU is transmitted after a delay corresponding to SIFS.

TB PPDUs 941 and 942 may be transmitted at the same time period, and may be transmitted from a plurality of STAs (e.g., user STAs) having AIDs indicated in the trigger frame 930. An ACK frame 950 for the TB PPDU may be implemented in various forms.

Figure 10:
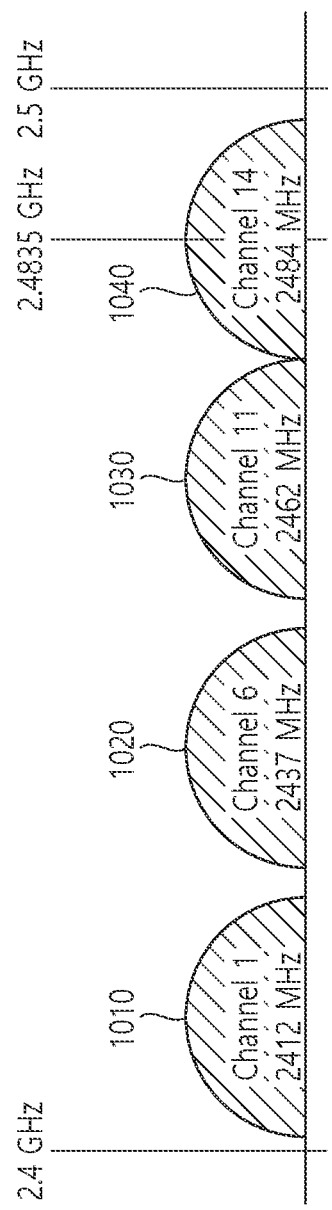
FIG. 10 illustrates an example of a channel used/supported/defined within a 2.4 GHz band.

FIG. 10 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be $(2.407+0.005*N)$ GHz. The channel index may be called in various terms such as a channel number or the like. Specific numerical values of the channel index and center frequency may be changed.

FIG. 10 exemplifies 4 channels within a 2.4 GHz band. Each of 1st to 4th frequency domains 1010 to 1040 shown herein may include one channel. For example, the 1st frequency domain 1010 may include a channel 1 (a 20 MHz channel having an index 1). In this case, a center frequency of the channel 1 may be set to 2412 MHz. The 2nd frequency domain 1020 may include a channel 6. In this case, a center frequency of the channel 6 may be set to 2437 MHz. The 3rd frequency domain 1030 may include a channel 11. In this case, a center frequency of the channel 11 may be set to 2462 MHz. The 4th frequency domain 1040 may include a channel 14. In this case, a center frequency of the channel 14 may be set to 2484 MHz.

Figure 11:
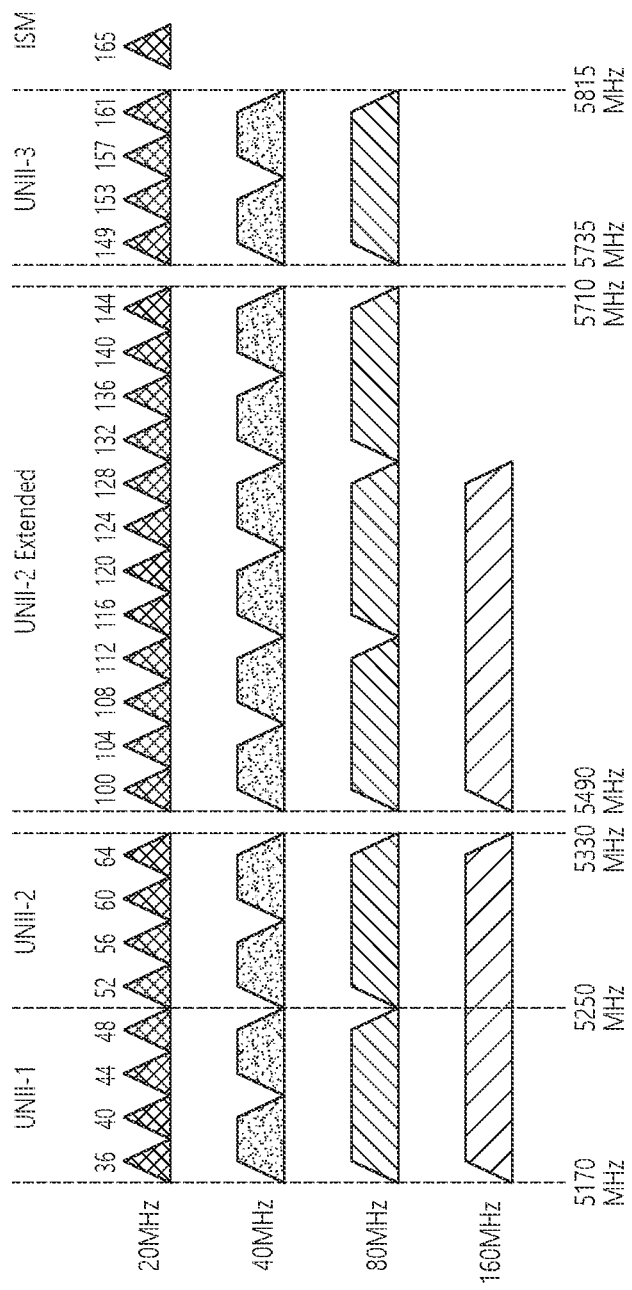
FIG. 11 illustrates an example of a channel used/supported/defined within a 5 GHz band.

FIG. 11 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 11 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 12:
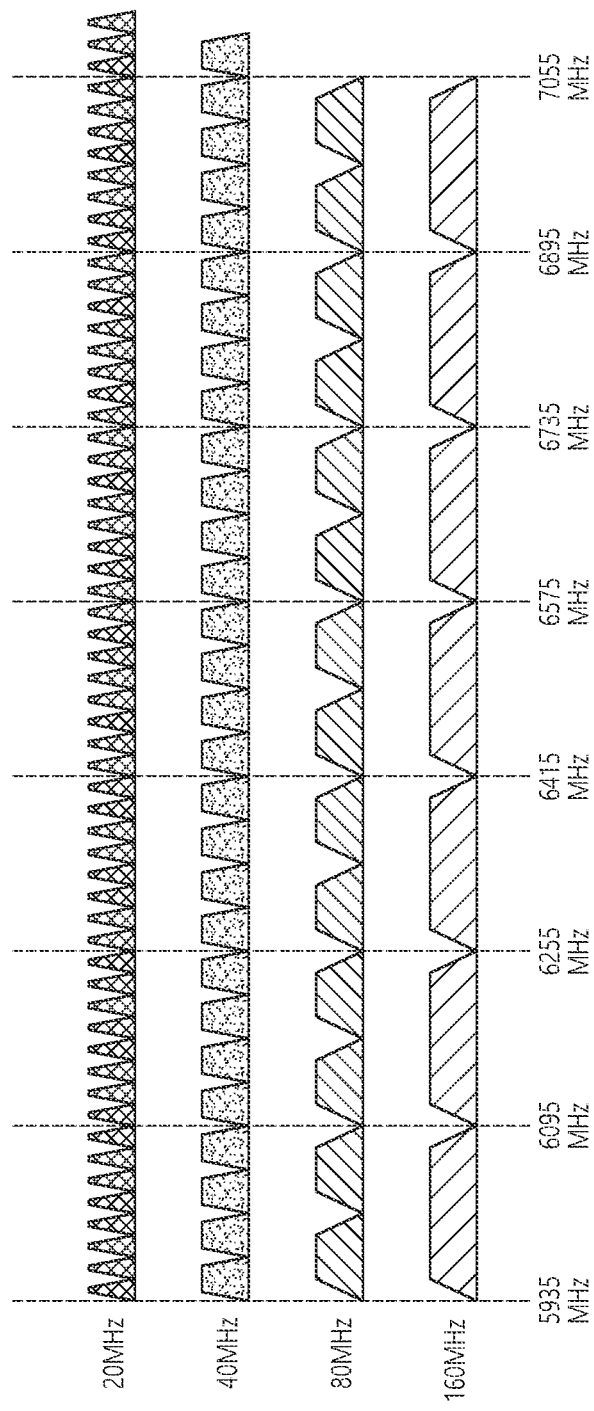
FIG. 12 illustrates an example of a channel used/supported/defined within a 6 GHz band.

FIG. 12 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 12 may be changed.

For example, the 20 MHz channel of FIG. 12 may be defined starting from 5.940 GHz. Specifically, among 20 MHz channels of FIG. 12, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 12 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N) GHz rule, an index of the 40 MHz channel of FIG. 13 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 12, a 240 MHz channel or a 320 MHz channel may be additionally added.

Hereinafter, a PPDU transmitted/received in an STA of the present specification will be described.

Figure 13:
FIG. 13 illustrates an example of a PPDU used in the present specification.

FIG. 13 illustrates an example of a PPDU used in the present specification.

The PPDU of FIG. 13 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

Figure 14:
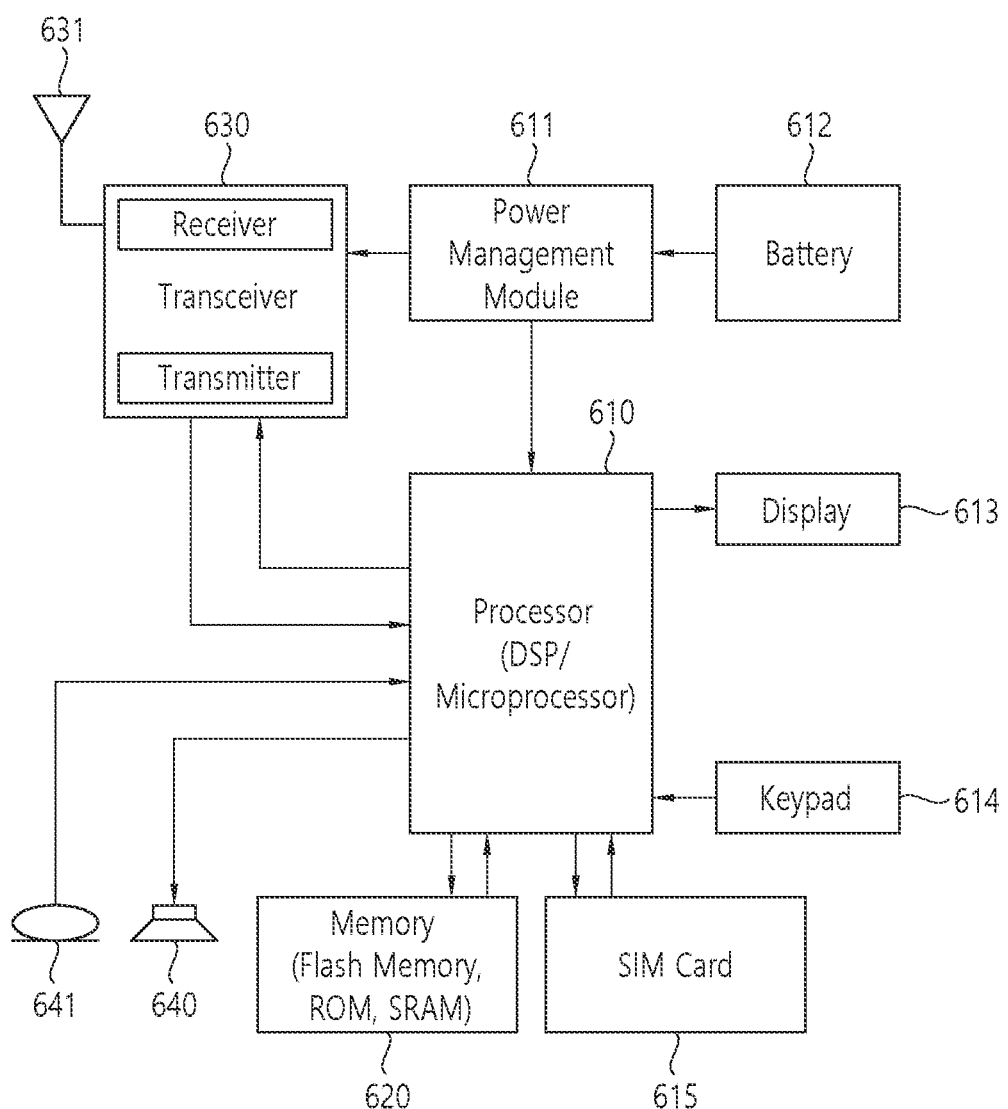
FIG. 14 illustrates an example of a modified transmission device and/or receiving device of the present specification.

The PPDU of FIG. 13 may indicate the entirety or part of a PPDU type used in the EHT system. For example, the example of FIG. 13 may be used for both of a single-user (SU) mode and a multi-user (MU) mode. In other words, the PPDU of FIG. 13 may be a PPDU for one receiving STA or a plurality of receiving STAs. When the PPDU of FIG. 14 is used for a trigger-based (TB) mode, the EHT-SIG of FIG. 13 may be omitted. In other words, an STA which has received a trigger frame for uplink-MU (UL-MU) may transmit the PPDU in which the EHT-SIG is omitted in the example of FIG. 13.

In FIG. 13, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 13 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 13, the L-LTF and the L-STF may be the same as those in the conventional fields.

The L-SIG field of FIG. 13 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier{subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 13. The U-SIG may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 us. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIG may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, '000000'.

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 14. The preamble puncturing implies that puncturing is applied to part (e.g., a secondary 20 MHz band) of the full band. For example, when an 80 MHz PPDU is transmitted, an STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 13 may include control information for the receiving STA. The EHT-SIG may be transmitted through at least one symbol, and one symbol may have a length of 4 us. Information related to the number of symbols used for the EHT-SIG may be included in the U-SIG.

The EHT-SIG may include a technical feature of the HE-SIG-B described with reference to FIG. 7 and FIG. 8. For example, the EHT-SIG may include a common field and a user-specific field as in the example of FIG. 7. The common field of the EHT-SIG may be omitted, and the number of user-specific fields may be determined based on the number of users.

As in the example of FIG. 7, the common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 8, each user field may be related to MU-MIMO allocation, or may be related to non-MU-MIMO allocation.

As in the example of FIG. 7, the common field of the EHT-SIG may include a CRC bit and a tail bit. A length of the CRC bit may be determined as 4 bits. A length of the tail bit may be determined as 6 bits, and may be set to '000000'.

As in the example of FIG. 7, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

The example of Table 5 to Table 7 is an example of 8-bit (or N-bit) information for various RU allocations. An index shown in each table may be modified, and some entries in Table 5 to Table 7 may be omitted, and entries (not shown) may be added.

TABLE 5

| Indices | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | 52 | | 1 |
| 2 | 26 | 26 | 26 | 26 | 26 | 52 | | 26 | 26 | 1 |
| 3 | 26 | 26 | 26 | 26 | 26 | 52 | | 52 | | 1 |
| 4 | 26 | 26 | | 52 | 26 | 26 | 26 | 26 | 26 | 1 |
| 5 | 26 | 26 | | 52 | 26 | 26 | 26 | 52 | | 1 |
| 6 | 26 | 26 | | 52 | 26 | 52 | | 26 | 26 | 1 |
| 7 | 26 | 26 | | 52 | 26 | 52 | | 52 | | 1 |
| 8 | | 52 | 26 | 26 | 26 | 26 | 26 | 26 | 26 | 1 |
| 9 | | 52 | 26 | 26 | 26 | 26 | 26 | 52 | | 1 |
| 10 | | 52 | 26 | 26 | 26 | 52 | | 26 | 26 | 1 |
| 11 | | 52 | 26 | 26 | 26 | 52 | | 52 | | 1 |
| 12 | | 52 | | 52 | 26 | 26 | 26 | 26 | 26 | 1 |
| 13 | | 52 | | 52 | 26 | 26 | 26 | 52 | | 1 |
| 14 | | 52 | | 52 | 26 | 52 | | 26 | 26 | 1 |
| 15 | | 52 | | 52 | 26 | 52 | | 52 | | 1 |
| 16 | 26 | 26 | 26 | 26 | 26 | | 106 | | | 1 |
| 17 | 26 | 26 | | 52 | 26 | | 106 | | | 1 |
| 18 | | 52 | 26 | 26 | 26 | | 106 | | | 1 |
| 19 | | 52 | | 52 | 26 | | 106 | | | 1 |

TABLE 6

| Indices | #1 | #2 | #3 | #4 | #5 | #6 | #7 | #8 | #9 | Number of entries |
|---|---|---|---|---|---|---|---|---|---|---|
| 20 | | 106 | | | 26 | 26 | 26 | 26 | 26 | 1 |
| 21 | | 106 | | | 26 | 26 | 26 | 52 | | 1 |
| 22 | | 106 | | | 26 | 52 | | 26 | 26 | 1 |
| 23 | | 106 | | | 26 | 52 | | 52 | | 1 |
| 24 | 52 | | 52 | | — | | 52 | | 52 | 1 |
| 25 | 242-tone RU empty (with zero users) | | | | | | | | | 1 |
| 26 | | 106 | | | 26 | | 106 | | | 1 |
| 27-34 | | | | | 242 | | | | | 8 |
| 35-42 | | | | | 484 | | | | | 8 |
| 43-50 | | | | | 996 | | | | | 8 |
| 51-58 | | | | | 2 * 996 | | | | | 8 |
| 59 | 26 | 26 | 26 | 26 | 26 | | 52 + 26 | | 26 | 1 |
| 60 | 26 | | 26 + 52 | | 26 | 26 | 26 | 26 | 26 | 1 |
| 61 | 26 | | 26 + 52 | | 26 | 26 | 26 | 52 | | 1 |
| 62 | 26 | | 26 + 52 | | 26 | 52 | | 26 | 26 | 1 |
| 63 | 26 | 26 | | 52 | 26 | | 52 + 26 | | 26 | 1 |
| 64 | 26 | | 26 + 52 | | 26 | | 52 + 26 | | 26 | 1 |
| 65 | 26 | | 26 + 52 | | 26 | 52 | | 52 | | 1 |

TABLE 7

| | #1 | #2 | #3 | #4 | #5 | #6 | #7 | #8 | #9 | |
|---|---|---|---|---|---|---|---|---|---|---|
| 66 | 52 | | 26 | 26 | 26 | | 52 + 26 | | 26 | 1 |
| 67 | 52 | | | 52 | 26 | | 52 + 26 | | 26 | 1 |
| 68 | 52 | | | 52 + 26 | | 52 | | 52 | | 1 |
| 69 | 26 | 26 | 26 | 26 | | 26 + 160 | | | | 1 |
| 70 | 26 | | 26 + 52 | | 26 | | 106 | | | 1 |
| 71 | 26 | 26 | | 52 | | 26 + 106 | | | | 1 |
| 72 | 26 | | 26 + 52 | | | 26 + 106 | | | | 1 |
| 73 | 52 | | 26 | 26 | | 26 + 106 | | | | 1 |
| 74 | 52 | | | 52 | | 26 + 106 | | | | 1 |
| 75 | | 106 + 26 | | | | 26 | 26 | 26 | 26 | 1 |
| 76 | | 106 + 26 | | | | 26 | 26 | 52 | | 1 |
| 77 | | 106 + 26 | | | | 52 | | 26 | 26 | 1 |
| 78 | | 106 | | | 26 | | 52 + 26 | | 26 | 1 |
| 79 | | 106 + 26 | | | | 52 + 26 | | | 26 | 1 |
| 80 | | 106 + 26 | | | | 52 | | 52 | | 1 |
| 81 | | 106 + 26 | | | | | 106 | | | 1 |
| 82 | | 106 | | | | | 26 + 106 | | | 1 |

The example of Table 5 to Table 7 relates to information related to a location of an RU allocated to a 20 MHz band. For example, 'an index 0' of Table 5 may be used in a situation where nine 26-RUs are individually allocated (e.g., in a situation where nine 26-RUs shown in FIG. 5 are individually allocated).

Meanwhile, a plurality or RUs may be allocated to one STA in the EHT system. For example, regarding 'an index 60' of Table 6, one 26-RU may be allocated for one user (i.e., receiving STA) to the leftmost side of the 20 MHz band, one 26-RU and one 52-RU may be allocated to the right side thereof, and five 26-RUs may be individually allocated to the right side thereof.

A mode in which the common field of the EHT-SIG is omitted may be supported. The mode in which the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of consecutive tones, and a second modulation scheme may be applied to the remaining half of the consecutive tones. That is, a transmitting STA may use the first modulation scheme to modulate specific control information through a first symbol and allocate it to half of the consecutive tones, and may use the second modulation scheme to modulate the same control information by using a second symbol and allocate it to the remaining half of the consecutive tones. As described above, information (e.g., a 1-bit field) regarding whether the DCM scheme is applied to the EHT-SIG may be included in the U-SIG.

An HE-STF of FIG. 13 may be used for improving automatic gain control estimation in a multiple input multiple output (MIMO) environment or an OFDMA environment. An HE-LTF of FIG. 13 may be used for estimating a channel in the MIMO environment or the OFDMA environment.

A PPDU (e.g., EHT-PPDU) of FIG. 13 may be configured based on the example of FIG. 4 and FIG. 5.

For example, an EHT PPDU transmitted on a 20 MHz band, i.e., a 20 MHz EHT PPDU, may be configured based on the RU of FIG. 4. That is, a location of an RU of EHT-STF, EHT-LTF, and data fields included in the EHT PPDU may be determined as shown in FIG. 4.

An EHT PPDU transmitted on a 40 MHz band, i.e., a 40 MHz EHT PPDU, may be configured based on the RU of FIG. 5. That is, a location of an RU of EHT-STF, EHT-LTF, and data fields included in the EHT PPDU may be determined as shown in FIG. 5.

Since the RU location of FIG. 5 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 6 but the RU of FIG. 5 is repeated twice.

When the pattern of FIG. 5 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 5 is repeated several times.

The PPDU of FIG. 13 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "module 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 13. In other words, the receiving STA may determine the RX PPDU as the EHT PPDU, based on: 1) first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "module 3" to a value of a length field of the L-SIG is detected as "1" or "2."

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0," the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 13. The PPDU of FIG. 13 may be used to transmit/receive frames of various types. For example, the PPDU of FIG. 13 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 14 may be used for a management frame. An example of the management frame may include a beacon frame, a (re-)association request frame, a (re-)association response frame, a probe request frame, and a probe response frame. For example, the PPDU of FIG. 13 may be used for a data frame. For example, the PPDU of FIG. 13 may be used to simultaneously transmit at least two or more of the control frame, the management frame, and the data frame.

FIG. 14 illustrates an example of a modified transmission device and/or receiving device of the present specification.

Figure 15:
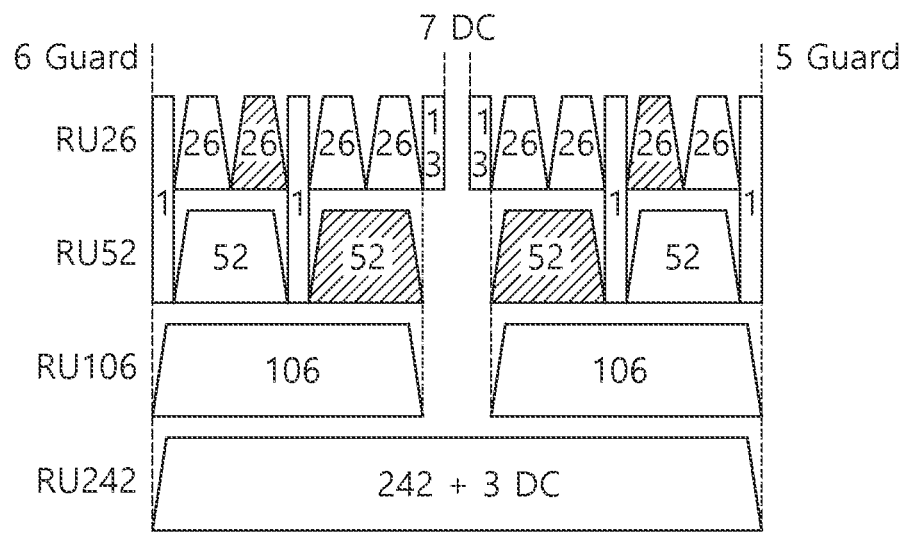
FIG. 15 shows an example of an aggregation of RU26 and RU52 in 20 MHz.

Each device/STA of the sub-figure (a)/(b) of FIG. 1 may be modified as shown in FIG. 15. A transceiver 630 of FIG. 14 may be identical to the transceivers 113 and 123 of FIG. 1. The transceiver 630 of FIG. 14 may include a receiver and a transmitter.

A processor 610 of FIG. 14 may be identical to the processors 111 and 121 of FIG. 1. Alternatively, the processor 610 of FIG. 14 may be identical to the processing chips 114 and 124 of FIG. 1.

A memory 620 of FIG. 14 may be identical to the memories 112 and 122 of FIG. 1. Alternatively, the memory 620 of FIG. 14 may be a separate external memory different from the memories 112 and 122 of FIG. 1.

Referring to FIG. 14, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 14, a speaker 640 may output a result related to a sound processed by the processor 610. A microphone 641 may receive an input related to a sound to be used by the processor 610.

Hereinafter, technical features applicable to the EHT standard will be described.

According to an embodiment of the present specification, the EHT standard may support PPDUs of 320 MHz bandwidth and 160+160 MHz. In addition, 240 MHz transmission and 160+80 MHz transmission may be supported. The 240 MHz transmission and 160+80 MHz transmission may be configured by applying 80 MHz preamble puncturing in 320 MHz bandwidth and 160+160 MHz bandwidth, respectively. For example, the 240 MHz bandwidth and 160+80 MHz bandwidth may be configured based on three 80 MHz channels including a primary 80 MHz (channel).

According to an embodiment of the present specification, the EHT standard may re-use a tone plan of the IEEE 802.11ax standard a 20/40/80/160/80+80 MHz PPDU. According to an embodiment, a 160 MHz OFDMA tone plan of the IEEE 802.11ax standard may be duplicated and used for 320 MHz and 160+160 MHz PPDUs.

According to an embodiment of the present specification, the transmission in 240 MHz and 160+80 MHz may consist of three 80 MHz segments. For example, the tone plan of each 80 MHz segment may be configured in the same manner as the 80 MHz tone plan of the IEEE 802.11ax standard.

According to an embodiment of the present specification, a 160 MHz tone plan may be duplicated and used for a non-OFDMA tone plan of a 320/160+160 MHz PPDU.

According to an embodiment of the present specification, a duplicated HE160 tone plan may be used for a 320/160+160 MHz PPDU non-OFDMA tone plan.

According to an embodiment of the present specification, in each 160 MHz segment for a non-OFDMA tone plan of a 320/160+160 MHz PPDU, 12 and 11 null tones may be configured on the leftmost side and the rightmost side, respectively.

According to an embodiment of the present specification, the data part of the EHT PPDU may use the same subcarrier spacing as the data part of the IEEE 802.11ax standard.

Hereinafter, technical features of a resource unit (RU) applicable to the EHT standard will be described.

According to an embodiment of the present specification, in the EHT standard, one or more RUs may be allocated to a single STA. For example, coding and interleaving schemes for multiple RUs allocated to a single STA may be variously set.

According to an embodiment of the present specification, small-size RUs may be aggregated with other small-size RUs. According to an embodiment of the present specification, large-size RUs may be aggregated with other large-size RUs.

For example, RUs of 242 tones or more may be defined/set as 'large size RUs'. For another example, RUs of less than 242 tones may be defined/configured as 'small size RUs'.

According to an embodiment of the present specification, there may be one PSDU per STA for each link. According to an embodiment of the present specification, for LDPC encoding, one encoder may be used for each PSDU.

Small-Size RUs

According to an embodiment of the present specification, an aggregation of small-size RUs may be set so as not to cross a 20 MHz channel boundary. For example, RU106+RU26 and RU52+RU26 may be configured as an aggregation of small-size RUs.

According to an embodiment of the present specification, in PPDUs of 20 MHz and 40 MHz, contiguous RU26 and RU106 may be aggregated/combined within a 20 MHz boundary.

According to an embodiment of the present specification, in PPDUs of 20 MHz and 40 MHz, RU26 and RU52 may be aggregated/combined.

Figure 21:
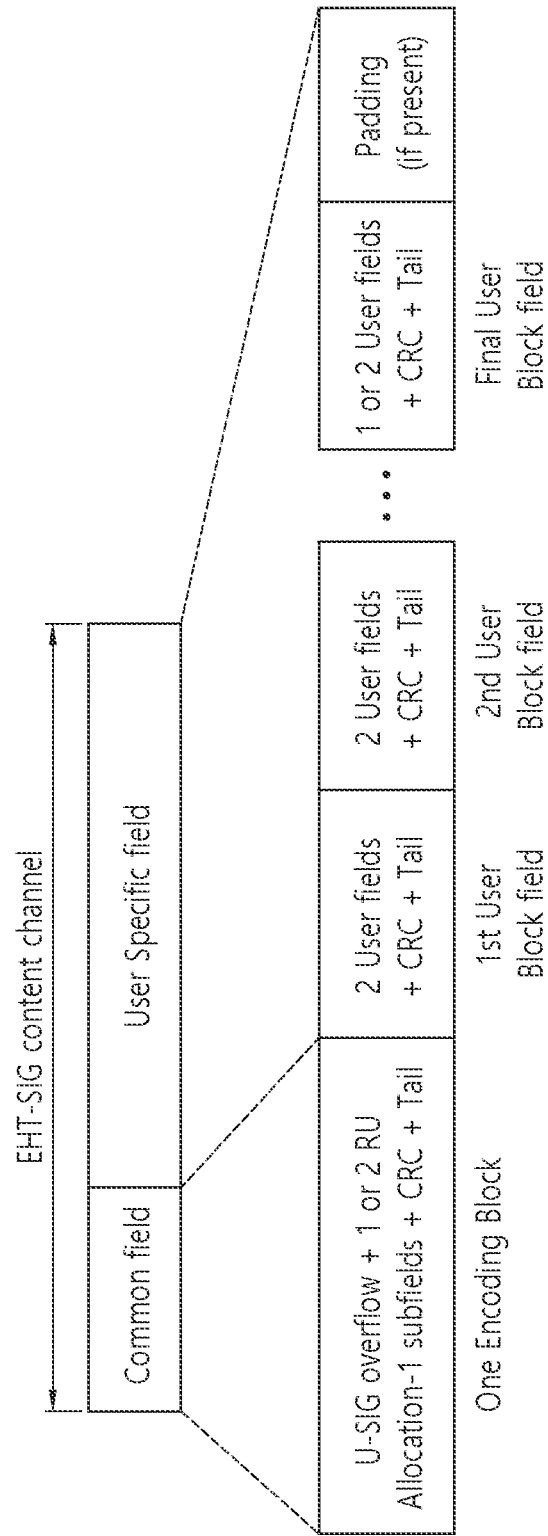
FIG. 21 is a diagram for explaining technical features of an OFDMA-based PPDU.

For example, in 20 MHz (or 20 MHz PPDU), an example of contiguous RU26 and RU52 may be shown through FIG. 21.

FIG. 15 shows an example of an aggregation of RU26 and RU52 in 20 MHz.

Referring to FIG. 15, shaded RU26 and RU52 may be aggregated. For example, the second RU26 and the second RU52 may be aggregated. For another example, the seventh RU and the third RU52 may be aggregated.

For example, in 40 MHz, an example of contiguous RU26 and RU52 is described in FIG. 15.

Figure 16:
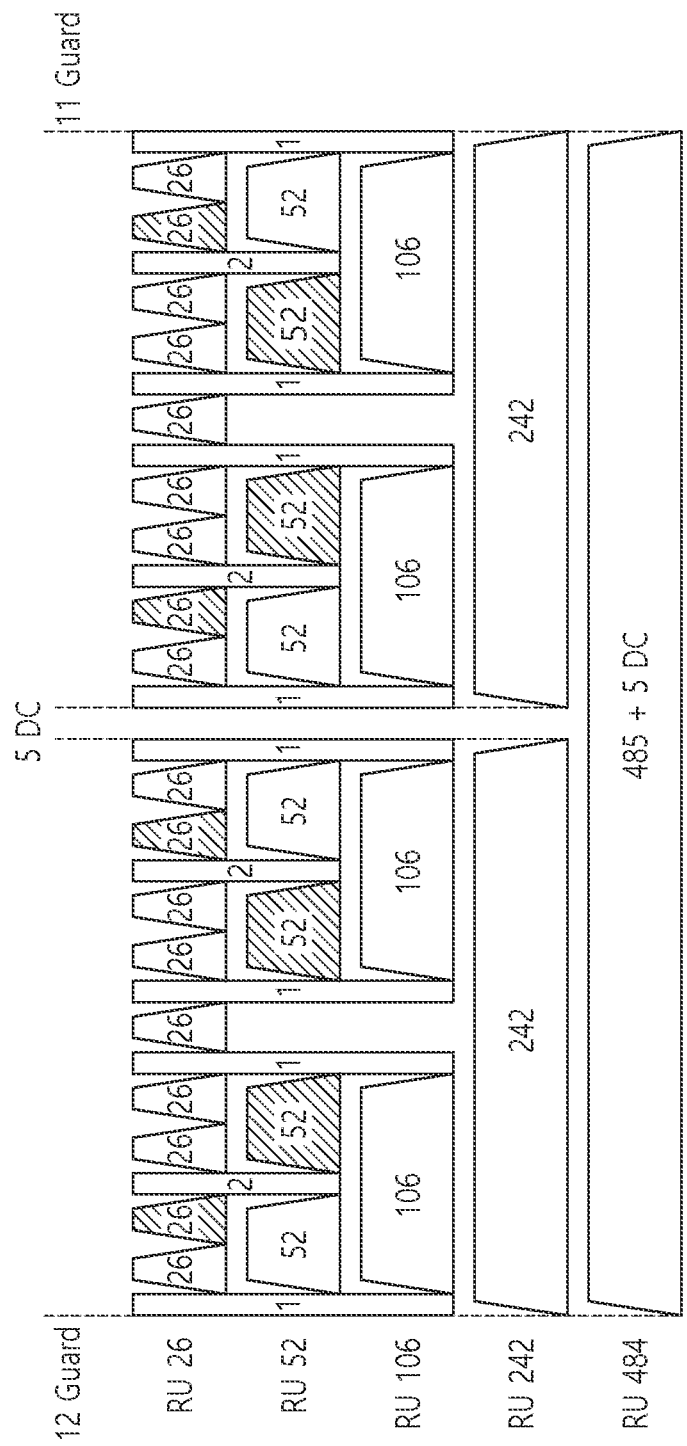
FIG. 16 shows an example of an aggregation of RU26 and RU52 in 40 MHz.

FIG. 16 shows an example of an aggregation of RU26 and RU52 in 40 MHz.

Referring to FIG. 16, shaded RU26 and RU52 may be aggregated. For example, the second RU26 and the second RU52 may be aggregated. For another example, the eighth RU26 and the third RU52 may be aggregated. For another example, the eleventh RU26 and the sixth RU52 may be aggregated. For another example, the seventeenth RU26 and the seventh RU52 may be aggregated.

According to an embodiment of the present specification, RU26 and RU52 may be aggregated/combined in a PPDU of 80 MHz.

Figure 17:
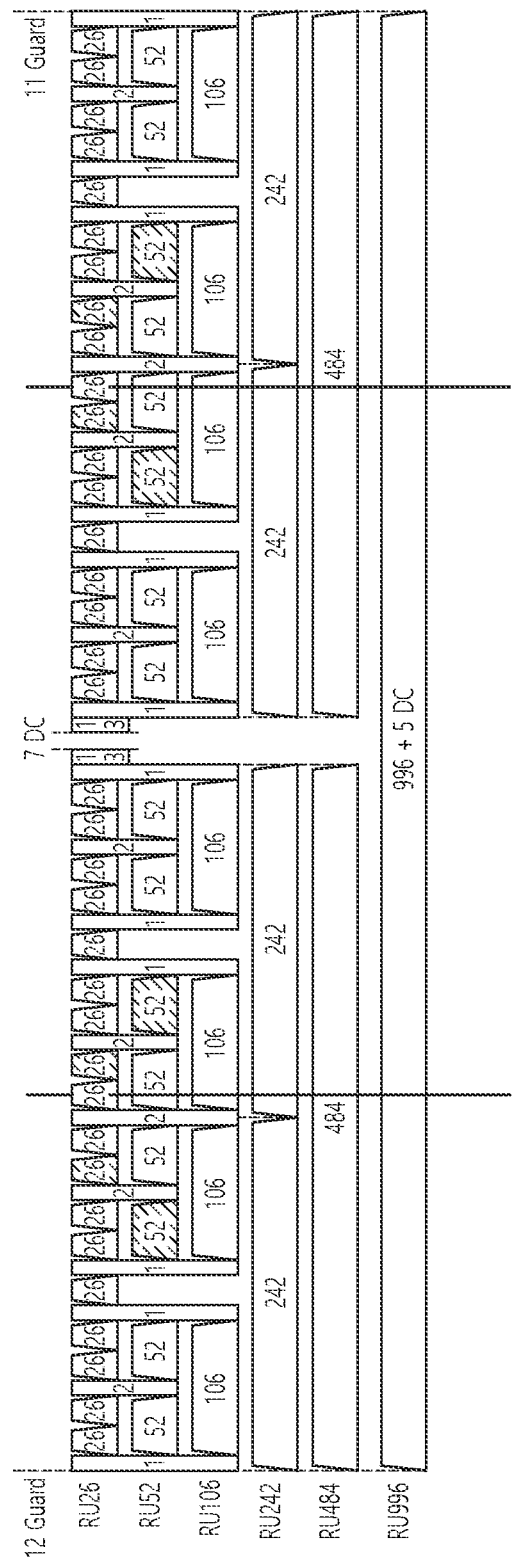
FIG. 17 shows an example of an aggregation of RU26 and RU52 in 80 MHz.

For example, an example of contiguous RU26 and RU52 in 80 MHz may be shown by FIG. 17.

FIG. 17 shows an example of an aggregation of RU26 and RU52 in 80 MHz.

Referring to FIG. 17, 80 MHz may be divided into the first 40 MHz and the second 40 MHz. For example, within the first 40 MHz, the 8th RU26 and the 3rd RU52 may be aggregated. For another example, within the first 40 MHz, the 11th RU26 and the 6th RU52 may be aggregated. For another example, within the second 40 MHz, the 8th RU26 and the 3rd RU52 may be aggregated. For another example, within the second 40 MHz, the 11th RU26 and the 6th RU52 may be aggregated.

According to an embodiment, when LDPC coding is applied, a single tone mapper may be used for RUs having less than 242 tones.

Large-Size RUs

According to an embodiment, in OFDMA transmission of 320/160+160 MHz for a single STA, an aggregation of a large-size RUs may be allowed only within a primary 160 MHz or a secondary 160 MHz. For example, the primary 160 MHz (channel) may consist of a primary 80 MHz (channel) and a secondary 80 MHz (channel). The secondary 160 MHz (channel) can be configured with channels other than the primary 160 MHz.

According to an embodiment, in OFDMA transmission of 240 MHz for a single STA, an aggregated of large-size RUs may be allowed only within 160 MHz (band/channel), and the 160 MHz may consist of two adjacent 80 MHz channels.

According to an embodiment, in OFDMA transmission of 160+80 MHz for a single STA, an aggregation of large-size RUs may be allowed only within a continuous 160 MHz (band/channel) or within the remaining 80 MHz (band/channel).

In 160 MHz OFDMA, an aggregation of large-size RUs configured as shown in Table 8 may be supported.

TABLE 8

| RU size | Aggregate BW | Notes |
|---|---|---|
| 484 + 996 | 120 MHz | 4 options |

In 80 MHz OFDMA, an aggregation of large-size RUs configured as shown in Table 9 may be supported.

TABLE 9

| RU size | Aggregate BW | Notes |
|---|---|---|
| 484 + 242 | 60 MHz | 4 options |

In 80 MHz non-OFDMA, an aggregation of large-size RUs configured as shown in Table 10 may be supported. In 80 MHz non-OFDMA, puncturing can be applied. For example, one of four 242 RUs may be punctured.

TABLE 10

| RU size | Aggregate BW | Notes |
|---|---|---|
| 484 + 242 | 60 MHz | 4 options |

In 160 MHz non-OFDMA, an aggregation of large-size RUs configured as shown in Table 11 may be supported. In 160 MHz non-OFDMA, puncturing can be applied. For example, one of eight 242 RUs may be punctured. For another example, one of four 484 RUs may be punctured.

TABLE 11

| 80 MHz RU Size | 80 MHz RU size | Aggregate BW | Notes |
|---|---|---|---|
| 484 | 996 | 120 MHz | 4 options |
| 484 + 242 | 996 | 140 MHz | 8 options |

In 240 MHz non-OFDMA, an aggregation of large-size RUs configured as shown in Table 12 may be supported. In 240 MHz non-OFDMA, puncturing can be applied. For example, one of six 484 RUs may be punctured. For another example, one of three 996 RUs may be punctured.

TABLE 12

| 80 MHz RU size | 80 MHz RU size | 80 MHz RU size | Aggregate BW | Notes |
|---|---|---|---|---|
| 484 | 996 | 996 | 200 MHz | 6 options |
| — | 996 | 996 | 160 MHz | 3 options |

In 320 MHz non-OFDMA, an aggregation of large-size RUs configured as shown in Table 13 may be supported. In 320 MHz non-OFDMA, puncturing can be applied. For example, one of eight 484 RUs may be punctured. For another example, one of four 996 RUs may be punctured.

TABLE 13

| 80 MHz RU size | 80 MHz RU size | 80 MHz RU size | 80 MHz RU size | Aggregate BW | Notes |
|---|---|---|---|---|---|
| 484 | 996 | 996 | 996 | 280 MHz | 8 options |
| — | 996 | 996 | 996 | 240 MHz | 4 options |

Hereinafter, technical features related to the operating mode will be described.

According to an embodiment, a station (STA) supporting the EHT standard STA (hereinafter, "EHT STA") or a station (STA) supporting the EHT standard STA (hereinafter, "HE STA") may operate in a 20 MHz channel width mode. In the 20 MHz channel width mode, the EHT STA may operate by reducing the operating channel width to 20 MHz using an operating mode indication (OMI).

According to an embodiment, the EHT STA (or HE STA) may operate in an 80 MHz channel width mode. For example, in the 80 MHz channel width mode, the EHT STA may operate by reducing the operating channel width to 80 MHz using an operating mode indication (OMI).

According to an embodiment, the EHT STA may support sub-channel selective transmission (SST). An STA supporting the SST can quickly select (and switch to) another channel between transmissions to cope with fading in a narrow sub-channel.

The 802.11be standard (i.e., the EHT standard) can provide a higher data rate than the 802.11ax standard. The EHT (i.e., extreme high throughput) standard can support wide bandwidth (up to 320 MHz), 16 streams, and multi-band operation.

In the EHT standard, various preamble puncturing or multiple RU allocation may be supported in wide bandwidth (up to 320 MHz) and SU/MU transmission. In addition, in the EHT standard, a signal transmission/reception method through 80 MHz segment allocation is considered in order to support an STA with low end capability (e.g., 80 MHz only operating STA). Accordingly, in the following specification, a method of configuring/transmitting an EHT-SIG for the MU transmission in consideration of sub-channel selective transmission (SST) defined in the 11ax standard and Multi-RU aggregation may be proposed. For example, the EHT-SIG may be configured as a self-contained EHT-SIG. When the self-contained EHT-SIG is used, a technical feature for signaling RU allocation may be proposed in the present specification.

EHT PPDU Configuration

In order to support a transmission method based on the EHT standard, a new frame format may be used. When transmitting a signal through the 2.4/5/6 GHz band based on the new frame format, conventional Wi-Fi receivers (or STAs) (e.g., 802.11n) as well as receivers supporting the EHT standard receivers in compliance with the 802.11n/ac/ax standard) can also receive EHT signals transmitted through the 2.4/5/6 GHz band.

The preamble of the PPDU based on the EHT standard can be set in various ways. Hereinafter, an embodiment of configuring the preamble of the PPDU based on the EHT standard will be described. Hereinafter, a PPDU based on the EHT standard may be described as an EHT PPDU. However, the EHT PPDU is not limited to the EHT standard. The EHT PPDU may include not only the 802.11be standard (i.e., the EHT standard), but also a PPDU based on a new standard that is improved/evolved/extended with the 802.11be standard.

Figure 18:
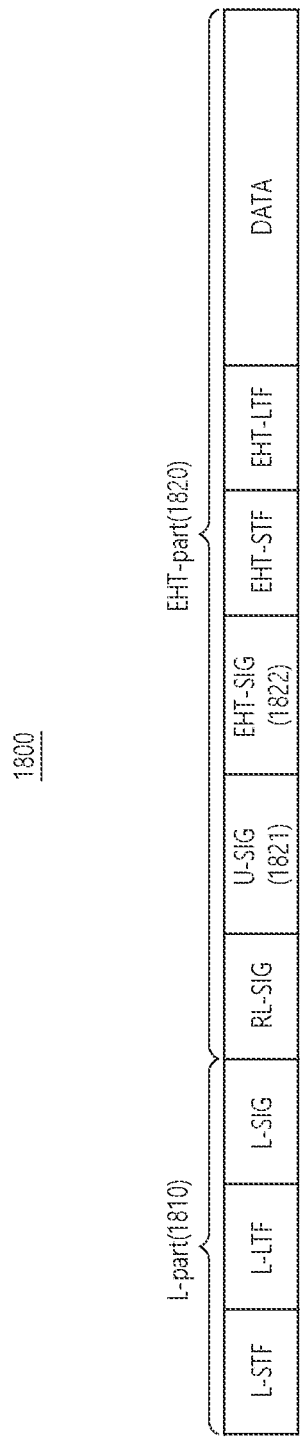
FIG. 18 shows an example of an EHT PPDU.

FIG. 18 shows an example of an EHT PPDU.

Referring to FIG. 18, an EHT PPDU 1800 may include an L-part 1810 and an EHT-part 1820. The EHT PPDU 1800 may be configured in a format to support backward compatibility. In addition, the EHT PPDU 1800 may be transmitted to a single STA and/or multiple STAs. The EHT PPDU 1800 may be an example of an MU-PPDU of the EHT standard.

The EHT PPDU 1800 may include the L-part 1810 preceding the EHT-part 1820 for coexistence or backward compatibility with a legacy STA (e.g., STA in compliance with the 802.11n/ac/ax standard). For example, the L-part 1810 may include L-STF, L-LTF, and L-SIG. For example, one phase rotation may be applied to the L-part 1810.

According to an embodiment, the EHT part 1820 may include RL-SIG, U-SIG 1821, EHT-SIG 1822, EHT-STF, EHT-LTF, and data fields. Similar to the 11ax standard, RL-SIG may be included in the EHT part 1820 for L-SIG reliability and range extension. The RL-SIG may be transmitted immediately after the L-SIG, and may be configured to repeat the L-SIG.

For example, four additional subcarriers may be applied to L-SIG and RL-SIG. The extra subcarriers may be configured at subcarrier indices [−28, −27, 27, 28]. The extra subcarriers may be modulated in a BPSK scheme. In addition, coefficients of [−1 −1 −1 1] may be mapped to the extra subcarriers.

For example, the EHT-LTF may be one of 1×EHT-LTF, 2×EHT-LTF, or 4×EHT-LTF. The EHT standard may support EHT-LTF for 16 spatial streams.

Each field in FIG. 18 may be the same as corresponding field described in FIG. 13.

Hereinafter, technical features that can be further improved in the present specification will be described.

The present specification may improve the technical features of various types of control information (or control fields). For example, the present specification may improve the technical characteristics of the EHT-SIG field (or EHT-SIG signal). More specifically, the present specification may improve the common field of the EHT-SIG field.

For example, the WLAN system according to the present specification (e.g., the 11be standard) supports a wide bandwidth communication supporting a maximum bandwidth of 320 MHz, and various types of preamble puncturing and/or multiple RU allocation may be supported. In addition, the 11be standard may support a signal transmission/reception method through an 80 MHz segment allocation in order to support an STA having a low-end capability (e.g., an 80 MHz only operating STA). In consideration of these technical features, an example of the present specification proposes that the EHT-SIG may include various control fields for common control information not included in the U-SUG when an 11be MU-PPDU configured/defined for MU communication is used. For example, the present specification proposes various examples of including common control information not included in the U-SIG in a common field of the EHT field.

In other words, an example of the present specification proposes various transmit/receive PPDUs. An example of the transmission/reception (TX/RX) PPDU may include various fields described in FIGS. 3, 7, 8, 13, 18, and 19. More specifically, an example of the transmission/reception PPDU may include at least one legacy field (e.g., L-STF, L-LTF, L-SIG, and RL-SIG in FIG. 18). In addition, an example of the transmission/reception PPDU may include a first control signal field (e.g., U-SIG field) and a second control signal field (e.g., EHT-SIG field) for the transmission/reception PPDU. For example, the first control signal field may be the U-SIG 1821 of FIG. 18, and the second control signal field may be the EHT-SIG 1822 of FIG. 18.

Control information not included in the first control signal field (e.g., U-SIG field) may be referred to as various names such as overflowed information or overflow information. The second control signal field (e.g., EHT-SIG field) may include a common field and a user specific field. Each of the common field and the user specific field may include at least one encoding block (e.g., a binary convolutional code (BCC) encoding block). One encoding block may be transmitted/received through one symbol. For example, one symbol may have a time length of 4 us.

According to an example of the present specification, the overflowed information may be included in a common field of the second control signal field (e.g., EHT-SIG field). The present specification proposes various examples of the overflowed information. In addition, the present specification proposes various examples of the common field and/or user specific field. A specific example is as follows.

The TX/RX PPDU proposed in the present specification may be used for communication for at least one user. For example, the technical features of the present specification may be applied to an MU-PPDU (e.g., EHT MU PPDU) conforming to the 11be standard. For example, an example of an MU-PPDU for transmitting a signal to multiple STAs in consideration of backward compatibility may be the PPDU of FIG. 18.

FIG. 19 shows an example of a first control signal field or U-SIG field of the present specification.

As depicted, the first control signal field (e.g., U-SIG field) may include a version independent field 1910 and a version dependent field 1920. For example, the version independent field 1910 may include control information that is constantly included regardless of the version of the WLAN (e.g., the IEEE 802.11 be and next-generation standards of the IEEE 802.11be). For example, the version dependent field 1920 may include control information dependent on a corresponding version (e.g., the IEEE 802.11be).

For example, the version independent field 1910 may include information related to a 3-bit version identifier indicating a Wi-Fi version defined after the 11be and 11be standards, a 1-bit DL/UL field BSS color, and/or a TXOP duration. For example, the version dependent field 1920 may include information related to a PPDU format type, a Bandwidth, and/or an MCS.

For example, in the first control signal field (e.g., U-SIG field) shown in FIG. 19, two symbols (e.g., two contiguous symbols each having a 4 us length) may be jointly encoded. In addition, the field of FIG. 19 may be configured based on 52 data tones and 4 pilot tones for each 20 MHz band/channel. In addition, the field of FIG. 19 may be modulated in the same manner as the HE-SIG-A of the conventional 11ax standard. In other words, the field of FIG. 19 may be modulated based on a BPSK scheme with a 1/2 code rate.

For example, the second control signal field (e.g., EHT-SIG field) may be divided into a common field and a user specific field, and may be encoded based on various MCS levels. For example, the common field may include indication information related to a spatial stream used in a transmission/reception PPDU (e.g., a data field) and indication information related to an RU. For example, the user specific field may include ID information used by at least one specific user (or receiving STA), MCS, and indication information related to coding. In other words, the user specific field includes decoding information (e.g., corresponding to the data field transmitted through at least one RU indicated by an RU allocation sub-field included in the common field). STA ID information assigned to the RU, MSC information, and/or channel coding type/rate information). In other words, the user specific field may include decoding information (STA ID information, MSC information, and/or channel coding type/rate information allocated to a corresponding RU) for a data field transmitted through at least one RU indicated by an RU allocation sub-field included in the common field.

An example of an information field/bit that may be included in the first control signal field (e.g., U-SIG field) is shown in Table 14 below. As described below, since there is a restriction on the length of the first control signal field (e.g., U-SIG field), some of the fields in Table 14 may overflow into other fields. That is, the bit lengths described in the table below may be changed, and at least one of the individual fields/bits listed in the table below may be omitted. Also, other fields/bits may be added.

TABLE 14

| Field | bits |
|---|---|
| PHY version Identifier | 3 |
| TXOP | 7 |
| BSS Color | 6 |
| DL/UL | 1 |
| BW | 3 |
| PPDU format | 2 |
| EHT-SIG MCS | 3 |
| Nsym of EHT-SIG/users of MU-MIMO | 5 |
| GI + LTF | 2 |
| Coding | 1 |
| LDPC Extra symbol | 1 |
| STBC | 1 |
| Beamformed | 1 |
| Pre-FEC padding | 2 |
| PE Disambiguity | 1 |
| doppler | 1 |
| spatial reuse | 4 |
| beam change | 1 |
| DCM | 1 |
| HARQ | 1 |
| Multi-AP | 1 |
| Compression | 1 |
| CRC | 4 |
| Tail | 6 |
| Total bits | 54 |

The first control signal field (e.g., U-SIG field) may consist of two contiguous symbols. In this case, the maximum number of bits that can be included in the first control signal field (e.g., U-SIG field) may be fixed or preset (e.g., fixed to 48/52 bits or preset). Accordingly, information that is not included in the first control signal field (e.g., U-SIG field) may exist. Such information/field may be referred to as various names, such as overflowed information, overflow information, U-SIG overflow, and U-SIG overflow information/field. According to an example of the present specification, the overflowed information is preferably included in the second control signal field (e.g., EHT-SIG field). In addition, since the overflowed information may not be user specific information, the corresponding information may be preferably included in the common field of the second control signal field (e.g., EHT-SIG field).

The transmission/reception PPDU (e.g., EHT MU PPDU) of the present specification may have various types/modes. Specifically, the transmission/reception PPDU may be configured based on a compressed mode or a non-compressed mode described below. The compressed mode described herein may be referred to as various names, such as "compression mode," "EHT SIG compression mode," and "PPDU Compression mode." As described in more detail below, the criterion for distinguishing the compressed mode and the non-compressed mode may be related to whether transmission/reception PPDU is used for a non-OFDMA mode, OFDMA mode, MU-MIMO mode, non-MU-MIMO mode, SU mode, NDP mode and/or SU DUP (duplication) mode. The compressed mode of the present specification may be a mode in which some fields (e.g., RU allocation subfield) in the second control signal field are omitted.

Feature 1. Hereinafter, an example of distinguishing between the compressed mode and the non-compressed mode will be described.

Feature 1.a. Hereinafter, an example in which a 1-bit identifier is configured to distinguish between compressed and non-compressed modes is proposed. The 1-bit identifier may be included in the U-SIG field.

Feature 1.a.i. The value of the 1-bit identifier may be set to '0' for the compressed mode, and set to '1' for the non-compressed mode (e.g., OFDMA mode). Hereinafter, technical features applied to the non-compressed mode (e.g., OFDMA mode) will be described.

Feature 1.a.i.1. Based on the non-compressed mode, the EHT-SIG field may include a common field and a user specific field.

Feature 1.a.i.2. In addition, as described above, the common field may include the RU allocation subfield (or RA field) and common information not included in the U-Sig (i.e., the overflowed information described above).

Feature 1.a.i.2.a. The Common field may consist of one encoding block (e.g., one BCC block) or two encoding blocks (e.g., two BCC blocks). When two encoding blocks are configured, overflow information may be included in the first encoding block together with at least one RU allocation subfield (or RA field).

Feature 1.a.i.2.b. A CRC field (e.g., a 4-bit CRC field) and a tail bit (e.g., a 6-bit tail bit) may be included in each encoding block included in the common field and the user specific field.

Feature 1.a.i.3. The common field may include preamble puncturing information for the full/entire/total frequency band.

Feature 1.a.i.4. The preamble puncturing information may be composed of ⅝-bit information.

Feature 1.a.i.5. The puncturing information for the entire BW may form one encoding block like the overflowed information described above.

Feature 1.a.i.6. Unlike the above, puncturing information for the full BW may not be included in the common field. This is because information related to the preamble puncturing may be indicated through the RU allocation subfield (or RA field) included in the common field.

Feature 1.a.ii. Hereinafter, technical features applied to the above-described compressed mode are described. The compressed mode may include a full bandwidth MU-MIMO mode in which the MU-MIMO technique is applied to the entire band of the PPDU and an occupied bandwidth MU-MIMO mode in which the MU-MIMO technique is applied to some bands of the PPDU.

Feature 1.a.ii.1. The EHT-SIG field based on the compressed mode may not include a common field.

Feature 1.a.ii.2. The common field may include preamble puncturing information for indicating puncturing information for the full/entire BW. This is because only preamble puncturing information for 80 MHz rather than the full/entire band may be transmitted through the U-SIG field.

Feature 1.a.ii.3. The preamble puncturing information may form one encoding block like the overflowed information described above.

Feature 1.a.ii.4. At least one block constituting the common field may be located before the user specific field.

Feature 1.a.ii.5. As another example, the preamble puncturing information may be included in a user specific field.

In this case, the preamble puncturing information may be included in one user block field together with the overflowed information described above.

Feature 1.a.ii.6. In the example described above, the user block field including common information (i.e., the overflowed information) may be configured only with the common information or may include one user field.

Feature 1.a.ii.7. Unlike the above example, the common field may be present in the EHT-SIG field even if the compressed mode is set.

Feature 1.a.ii.7.a. For example, since the indication for the preamble puncturing is possible using Multiple RU aggregation, the common field may be included in the EHT SIG field regardless of the compressed mode.

Feature 1.a.ii.7.a.i. In this case, the common field may include at least one RU allocation subfield (i.e., RA field).

Feature 1.a.ii.7.a.ii. In this case, the number of RU allocation subfields (i.e., RA field) included in the common field may be one or two, regardless of the full/entire BW of the PPDU on one EHT-SIG content channel.

Feature 1.a.ii.7.a.iii. The number of RU allocation subfields (i.e., RA field) included on one EHT-SIG content channel may be determined as a fixed value (e.g., one) when the compressed mode is set.

Feature 2. The above-described technical features may be changed as follows. For example, instead of setting two modes related to the compressed mode, a total of three modes may be set. The three modes described below may be referred to by various names (e.g., $1^{st}/2^{nd}/3^{rd}$ mode, $1^{st}/2^{nd}/3^{rd}$ type, $1^{st}/2^{nd}/3^{rd}$ type and mode, etc.).

Feature 2.a. In order to indicate the above-described three modes, for example, 2-bit indication information/field may be required. The 2-bit indication information/field may be included in, for example, the U-SIG field, and the 2-bit indication information/field may be referred to as various names.

Feature 2.a.i. For example, among the three modes, the first mode may be referred to as a non-compressed mode and may be related to an OFDMA mode. For the first mode, the 2-bit indication information/field may have a first value (e.g., '0'). Among the three modes, the second mode may be referred to as compressed mode 1 and may be related to a full bandwidth MU-MIMO mode (that is, a mode in which the MU-MIMO technique is applied to the full/entire bandwidth of a PPDU to support MU communications). Among the above three modes, the third mode may be referred to as compressed mode 2 and may be related to the MU-MIMO with a punctured BW mode (that is, a mode in which the MU-MIMO technique is applied on some bands of the full/entire band of the PPDU to support MU communications).

Feature 2.a.ii. Hereinafter, technical features applied to the first mode or the non-compressed mode will be described.

Feature 2.a.ii.1. The EHT-SIG field based on the first mode or non-compressed mode may be configured in the same way as the EHT-SIG based on the non-compressed mode described in Feature 1 above.

Feature 2.a.iii. Hereinafter, technical features applied to the second mode or the full bandwidth MU-MIMO mode will be described.

Feature 2.a.iii.1. A common field may not be included in the EHT-SIG field based on the second mode.

Feature 2.a.iii.2. In this case, one encoding block (e.g., a BCC block) including the overflowed information (i.e., information not included in the U-SIG), a CRC field (e.g., a CRC field with a length of 4 bits), and a tail field (e.g., a tail field with a length of 6 bits) may be configured, and the configured block may be located in front of the user specific field of the EHT-SIG field.

Feature 2.a.iii.3. Unlike the above example, the overflowed information, CRC field, and tail field may be included/encoded in the first user block field of the user specific field of the EHT SIG field.

Feature 2.a.iii.3.a. In the example described above, the first user block field of the user specific field may consist of a BCC block including only the above-described common information (e.g., overflowed information), or may consist of a BCC block further including one user field together with the common information.

Feature 2.a.iv. Hereinafter, technical features applied to the third mode or the punctured BW MU-MIMO mode will be described.

Feature 2.a.iv.1. The EHT-SIG field configured based on the third mode may include a common field.

Feature 2.a.iv.2. In this case, the common field may include at least one RU allocation subfield (i.e., RA field) and the overflowed information.

Feature 2.a.iv.2.a. The common field may consist of one encoding block (i.e., one BCC block) or may consist of two encoding blocks. At least one RU allocation subfield (i.e., RA field) and the overflowed information may be included in a first block among the two encoding blocks.

Feature 2.a.iv.2.b. Each block configured in the EHT-SIG field may include an individual CRC field (e.g., a 4-bit field) and a tail field (e.g., a 6-bit field).

Feature 2.a.iv.2.c. The common field may not include preamble puncturing information for the full/entire bandwidth of the PPDU. This is because information related to preamble puncturing can be indicated through MRU allocation (e.g., at least one RU allocation subfield) of RU allocation.

Feature 3. Technical features described in Feature 1 and/or Feature 2 may be modified in various ways. For example, regardless of the compressed mode, the EHT-SIG field may include preamble puncturing information for the entire BW, and in this case, the information may be composed of ⅚ bits.

Feature 3.a. The preamble puncturing information for the entire BW may form one encoding block (i.e., BCC block) based on information not included in the U-SIG field (i.e., the overflowed information), a CRC field (e.g., a 4-bit field), and a tail bit (e.g., a 6-bit field). The block described above may be located in the front of the EHT-SIG field, that is, in the above-mentioned common field.

Feature 4. The IEEE802.11be standard related to the present specification defines the MU-PPDU and Triggered based PPDU (TB-PPDU) for signal transmission. Also, as described above, various types of transmission modes (e.g., the aforementioned $1^{st}/2^{nd}/3^{rd}$ mode, $1^{st}/2^{nd}/3^{rd}$ type, $1^{st}/2^{nd}/3^{rd}$ type and mode, etc.) using the MU-PPDU) can be supported. When various transmission modes proposed in the present specification are used, the following technical features may be applied to the transmission/reception PPDU.

Feature 4.a. When the PPDU is transmitted/received based on the OFDMA technique/type/mode, the following technical features may be applied to the PPDU.

Feature 4.a.i. Two EHT-SIG content channels may be configured for the EHT-SIG field of the PPDU. The common field included in each EHT-SIG content channel may include at least one RU allocation subfield (i.e., RA field). The EHT-SIG content channel may be duplicated in units of 20 MHz.

Feature 4.a.ii. When another transmission mode is used, some subfields of the EHT-SIG field may be omitted, but when the OFDMA technique/type/mode is used, all subfields of the EHT-SIG field may be included. When the OFDMA technique/type/mode is used, it may be expressed that 'Non-compressed mode' for the PPDU (or EHT-SIG field) is configured/set.

Feature 4.b. When a PPDU is transmitted/received based on SU and/or SU-DUP technique/type/mode, the following technical features may be applied to the PPDU. The SU-DUP technique/type/mode may mean a technique/type/mode in which a data field included in a PPDU is duplicated for a single user (SU).

Feature 4.b.i. For example, when the SU and/or SU-DUP technique/type/mode is used, some subfields of the EHT-SIG field may be omitted/modified. Accordingly, when the PPDU is transmitted/received based on the SU/SU-DUP, it may be expressed that a 'compressed mode' for the PPDU (or EHT-SIG field) is configured/set.

Feature 4.b.ii. One EHT-SIG content channel may be configured for the EHT-SIG field of the PPDU. The one EHT-SIG content channel may be duplicated in units of 20 MHz.

Feature 4.b.iii. The RU allocation subfield (i.e., RA field) may not be included in the common field included in each EHT-SIG content channel.

Feature 4.b.iv. Each EHT-SIG content channel (e.g., a User Specific field of each EHT-SIG content channel) may include one user field.

Feature 4.b.v. The user field may include a non-MU-MIMO allocation user field.

Feature 4.b.vi. The EHT-SIG field (e.g., common field or user specific field) may include a subfield for the number of non-OFDMA users. The value of the subfield for the number of non-OFDMA users may be determined as a value obtained by subtracting '1' from the total number of non-OFDMA users. Accordingly, when the SU/SU-DUP is used, the value of the subfield may be set to 0.

Feature 4.b.vi.1. The value of the subfield for the number of non-OFDMA users may be expressed in various ways.

Feature 4.b.vii. When the above-described SU-DUP technique/type/mode is used, a specific MCS level of the MCS table may be indicated.

Feature 4.b.vii.1. For example, when the SU-DUP technique/type/mode is used, MCS0, DCM, and/or Nss=1 may be indicated. That is, MCS0 (that is, modulation based on BSPK and 1/2 code rate is applied) and DCM (Dual carrier modulation) techniques may be applied to the RU of the data field of the PPDU to which the SU-DUP is applied, and the data field is may be transmitted over a single stream. These three characteristics may be indicated through one specific control field. In addition, the data field of the PPDU related to the SU-DUP may include RU(s) duplicated on the frequency domain.

Feature 4.c. When a PPDU is transmitted/received based on the MU-MIMO scheme/type/mode, the following technical features may be applied to the PPDU.

Feature 4.c.i. For example, when the MU-MIMO technique/type/mode is used, some subfields of the EHT-SIG field may be omitted/modified. Accordingly, when a PPDU is transmitted/received based on the MU-MIMO, it may be expressed that a 'compressed mode' for the PPDU (or EHT-SIG field) is configured/set.

Feature 4.c.ii. When a common field is configured in each EHT-SIG content channel for the EHT SIG field, the RU allocation subfield (i.e., RA field) may not be included in the common field.

Feature 4.c.iii. At least one user field may be included in each EHT-SIG content channel (e.g., a user specific field of each EHT-SIG content channel). The corresponding user field may be configured based on an MU-MIMO allocation user field.

Feature 4.c.iv. The EHT-SIG field (e.g., a common field or a User Specific field) may include a subfield (e.g., a 3-bit subfield) for the number of non-OFDMA users. Since the simultaneous transmission mode for multiple users (MU) is used, the subfield for the number of non-OFDMA users may be set to a non-zero value.

Feature 4.c.iv.1. For example, the subfield for the number of non-OFDMA users may be as follows. That is, the value of the subfield for the number of non-OFDMA users may be set to a value obtained by subtracting '1' from the total number of non-OFDMA users.

TABLE 15

| Bits (values) | # of non-OFDMA user | bits | # of non-OFDMA user |
|---|---|---|---|
| 000 (0) | 1 | 100 (4) | 5 |
| 001 (1) | 2 | 101 (5) | 6 |
| 010 (2) | 3 | 110 (6) | 7 |
| 011 (3) | 4 | 111 (7) | 8 |

Feature 4.d. When the PPDU is transmitted/received based on the NDP technique/type/mode, the following technical features may be applied to the PPDU. The STA performing the beamformer operation for the sounding procedure may transmit an NDPA (e.g., EHT Null Data Packet Announcement) frame, and may transmit an NDP frame after SIFS. When the PPDU for the NDP frame is transmitted/received, it may be expressed that the NDP scheme/type/mode is used. The NDP PPDU may not include a data field, and an STF/LTF field for the NDP PPDU may be individually defined.

Feature 4.d.i. For example, when the NDP technique/type/mode is used, some subfields of the EHT-SIG field may be omitted/modified. Accordingly, when a PPDU is transmitted/received based on the MU-MIMO, it may be expressed that a 'compressed mode' for the PPDU (or EHT-SIG field) is configured/set.

Feature 4.d.ii. For example, the NDP PPDU may include the U-SIG field and not the EHT-SIG field. As another example, the NDP PPDU may include the U-SIG field and the EHT SIG field.

Feature 4.d.iii. When configured to include the EHT-SIG field, the RA field is not included in the common field of the EHT-SIG content channel.

Feature 4.d.iv. For example, when the EHT-SIG field is included, the EHT-SIG field may include one user field. The STA-ID of the one user field may have a specific value (e.g., 2046 or another value reserved for AID12) to indicate the NDP scheme/mode/type.

Feature 4.d.iv.1. In the above example, the number of non-OFDMA users included in the EHT-SIG field may be configured based on the technique of Table 15 described above. For example, for the NDP scheme/mode/type, the subfield for the number of non-OFDMA users may be set to 0.

Feature 4.d.iv.2. Unlike the above example, the value of the # of non-OFDMA-users field may be set to a different value.

Feature 4.d.v. The number of EHT-SIG content channels for the NDP PPDU may be one. The EHT-SIG content channel may be duplicated in units of 20 MHz.

Feature 5. Hereinafter, an example of indicating information related to the above-described transmission mode/method/type based on various fields/subfields is proposed.

Feature 5.a. For example, the present specification may indicate information related to the above-described transmission mode/method/type based on the compressed mode subfield.

Feature 5.a.i. For example, the name of the subfield may be changed.

Feature 5.a.ii. For example, the compressed mode subfield may consist of 2 bits, and may indicate various transmission modes.

Feature 5.a.ii.1. Content of Compressed mode subfield

TABLE 16

| Compressed mode bits | Transmission mode | Note |
| --- | --- | --- |
| 00 | TB PPDU | no EHT-SIG |
| 01 | OFDMA | EHT-SIG, RU Allocation: CC = [1 2 1 2], No SIG compression |
| 10 | MU-MIMO | EHT-SIG, No RU Allocation, CC = [1 2 1 2], SIG compression |
| 11 | SU/SU-DUP/NDP | EHT-SIG, No RU Allocation, CC = [1 1 1 1], SIG compression |

Feature 5.a.ii.2. The above bit index or order is an example. Accordingly, a different index or order may be used for the transmission mode indication.

Feature 5.a.ii.3. An example of Table 16 may indicate not only the PPDU type but also the transmission mode by using the compressed mode field. Accordingly, the example of Table 16 can reduce the signaling overhead of the U-SIG field.

Feature 5.b. Unlike the above example, various transmissions can be indicated using the PPDU type field defined in the U-SIG field.

Feature 5.b.i. The PPDU type field included in the U-SIG field may have a 2-bit length. The PPDU type field may be determined as follows.

TABLE 17

| PPDU type field | Transmission mode | Note |
| --- | --- | --- |
| 00 | TB PPDU | no EHT-SIG |
| 01 | OFDMA | EHT-SIG, RU Allocation: CC = [1 2 1 2], no SIG compression |
| 10 | MU-MIMO | EHT-SIG, No RU Allocation, CC = [1 2 1 2], SIG compression |
| 11 | SU/SU-DUP/NDP | EHT-SIG, No RU Allocation, CC = [1 1 1 1], SIG compression |

Feature 5.b.ii. The PPDU type field may indicate a compressed mode and another transmission mode. Accordingly, the PPDU type field can reduce signaling overhead.

Feature 5.b.iii. The bit index or order is an example. Accordingly, a different index or order may be used for the transmission mode indication.

Feature 5.c. The above-described example may indicate the transmission mode using only individual subfields. For example, when a transmission mode is indicated through an individual subfield rather than a combination of different subfields, complexity may be reduced and signaling overhead may be reduced.

Feature 5.d. Since the above-described example is indicated using an individual field, signaling error can be reduced.

Feature 5.e. The 2-bit field presented in the above example may be used together with other fields. That is, in order to indicate an additional transmission or PPDU type, one bit of additional information may be allocated. The 1-bit additional information may be indicated by various names, such as extended PPDU bit or extended Compressed mode bit.

Feature 5.e.i. The 1-bit additional information may be set as a dependent information bit of the U-SIG field.

Feature 5.e.ii. The 1-bit additional information is preferably continuous to the PPDU type field in the U-SIG field.

Feature 5.e.iii. The 1-bit additional information may include control information regarding various additional features. For example, the 1-bit additional information may indicate a transmission for HARQ and/or Multi-AP. For example, the 1-bit additional information includes information related to whether a specific HARQ technique (and/or a specific Multi-AP technique) is applied to the PPDU and/or a previously applied HARQ technique (and/or a specific Multi-AP technique) is continuously applied. In addition, the 1-bit additional information may be combined with other subfields included in the U-SIG field to indicate information related to the HARQ and/or Multi-AP. For example, the 1-bit additional information may be combined with other subfields included in the U-SIG field to indicate a specific HARQ and/or Multi-AP scheme.

Feature 5.f. For example, as in the above-described example (e.g., the example related to Table 16/17), the SU/SU-DUP/NDP mode may be transmitted using the above-described compressed mode, in the same way as the MU-MIMO mode. That the same compressed mode is used can be indicated through the 2-bit value in Table 16/17.

Feature 5.f.i. Therefore, in the SU/SU-DUP/NDP mode and MU-MIMO mode transmitted using the compressed mode, the field for the number of non-OFDMA users (e.g., # of non-OFDMA-users field) may be configured as shown below.

Feature 5.f.i.1. For example, during the MU-MIMO (i.e., non-OFDMA MU-MIMO) transmission, the value of the # of non-OFDMA-users field may be determined as a value obtained by subtracting '1' from the number of non-OFDMA users as follows.

TABLE 18

| Bits (values) | # of non-OFDMA user | bits | # of non-OFDMA user |
| --- | --- | --- | --- |
| 000 (0) | 1 | 100 (4) | 5 |
| 001 (1) | 2 | 101 (5) | 6 |
| 010 (2) | 3 | 110 (6) | 7 |
| 011 (3) | 4 | 111 (7) | 8 |

Feature 5.f.i.2. Unlike the above, when the SU/SU-DUP/NDP mode is used, the # of non-OFDMA-users field may be as follows to indicate one user or zero user.

TABLE 19

| Bits (values) | # of non-OFDMA user | bits | # of non-OFDMA user |
|---|---|---|---|
| 000 (0) | 0 | 010~111 (2~7) | Reserved |
| 001 (1) | 1 | | |

Since the contents of the table may be variously changed, for example, the value of the # of non-OFDMA-users field may be configured to include 0 to 6.

Feature 5.f.i.2.a. For another example, in order to indicate zero user and one user in the SU/SU-DUP/NDP mode, it may be indicated using the MSB or LSB 1 bit of the # of non-OFDMA-users field bit.

Feature 5.f.i.2.b. If MSB 1 bit is used, relevant features may be as follows. Feature 5.f.i.2.b.i. For example, it may be indicated through B0 (i.e., the MSB 1 bit) constituting the # of non-OFDMA-users field. For example, if B0=0, zero user may be indicated, and if B0=1, one user may be indicated.

Feature 5.f.i.2.b.ii. B1 and B2 except for the MSB 1 bit may be reserved or used for other information indication.

Feature 5.f.i.2.c. As another example, the case in which the LSB 1 bit is used is as follows.

Feature 5.f.i.2.c.i. For example, it may be indicated through B2 (i.e., the LSB 1 bit) constituting the # of non-OFDMA-users field. For example, if B2=0, zero user may be indicated, and if B2=1, one user may be indicated.

Feature 5.f.i.2.c.ii Except for the LSB 1 bit, B0 and B1 may be reserved or used for other information indication.

Feature 5.f.i.3. As described above, the value of the # of non-OFDMA-users field may indicate the number of users according to different schemes according to the indicated mode.

Additional details related to the example of the present specification described above will be described as follows.

Figure 20:
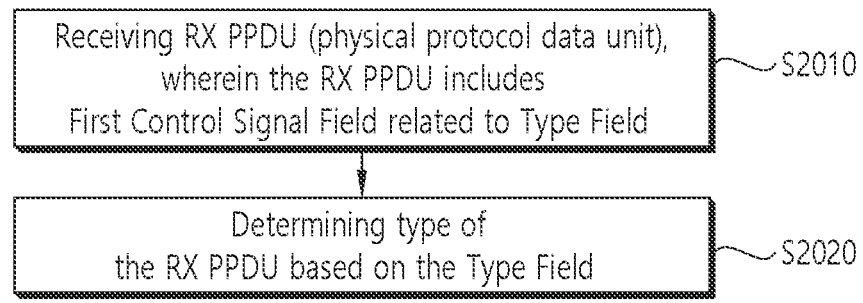
FIG. 20 is a flowchart illustrating an operation performed by a receiving STA.

FIG. 20 is a flowchart illustrating an operation performed by a receiving STA.

As shown, the receiving STA may receive a reception physical protocol data unit (PPDU) (S2010).

For example, the reception PPDU may include a first control signal field for interpreting the reception PPDU, a second control signal field including additional control information for the reception PPDU, and a data field.

For example, the reception PPDU may be an extremely high throughput (EHT) PPDU, the first control signal field may be a Universal SIGNAL (U-SIG) field, and the second control signal field may be an EHT-SIG field.

For example, the first control signal field may include a type field having 2-bit information about the type of the reception PPDU. For example, the 2-bit information may be the PPDU type field described in Table 17.

As shown, the receiving STA may determine the type (or transmission mode) of the reception PPDU based on the type field.

For example, the receiving STA may determine the reception PPDU as an OFDMA-based PPDU based on the type field having a first value. For example, the first value may be '01' (or another preset value) shown in Table 17. The PPDU based on the OFDMA technique/type/mode may have various technical features described in the above-described examples.

FIG. 21 is a diagram for explaining technical features of an OFDMA-based PPDU. For example, when the OFDMA mode is indicated through the 2-bit type field (or other control field), the EHT-SIG field may be configured based on the example of FIG. 21.

An example of FIG. 21 is an example of an EHT-SIG field for a PPDU of a 20/40/80 MHz band. Also, it is an example of a common field and a user specific field included in one EHT-SIG content channel. For example, the common field of FIG. 21 may consist of one encoding block (i.e., a BCC block). The common field may include the U-SIG overflow (i.e., the overflowed information described above). In addition, the PPDU of the 20/40 MHz band may include one RU allocation sub-field, and the PPDU of the 80 MHz band may include two RU allocation sub-fields. Also, as shown, a user specific field may be configured therein.

For example, when the bandwidth of the PPDU is 160 MHz or more, the example of FIG. 21 may be changed. For example, when the bandwidth of the PPDU is 160 MHz, the common field may consist of two encoding blocks (i.e., BCC blocks). In this case, the first encoding block among the two blocks may include the U-SIG overflow (i.e., overflowed information described above) and two RU allocation sub-fields, and may include a CRC and a Tail field. In addition, the second encoding block among the two blocks may include two RU allocation sub-fields, and may include a CRC and a Tail field.

For example, when the bandwidth of the PPDU is 320 MHz, the example of FIG. 21 may be changed as follows. For example, when the bandwidth of the PPDU is 320 MHz, the common field may consist of two encoding blocks (i.e., BCC blocks). In this case, the first encoding block among the two blocks may include the U-SIG overflow (i.e., overflowed information described above) and two RU allocation sub-fields, and may include a CRC and a Tail field. In addition, the second encoding block among the two blocks may include 6 RU allocation sub-fields, and may include CRC and Tail fields.

For example, the receiving STA may determine the reception PPDU as an MU-MIMO-based PPDU based on the type field having a second value. For example, the second value may be '10' (or another preset value) shown in Table 17. The PPDU based on the MU-MIMO technique/type/mode may have various technical features described in the above-described examples.

Figure 22:
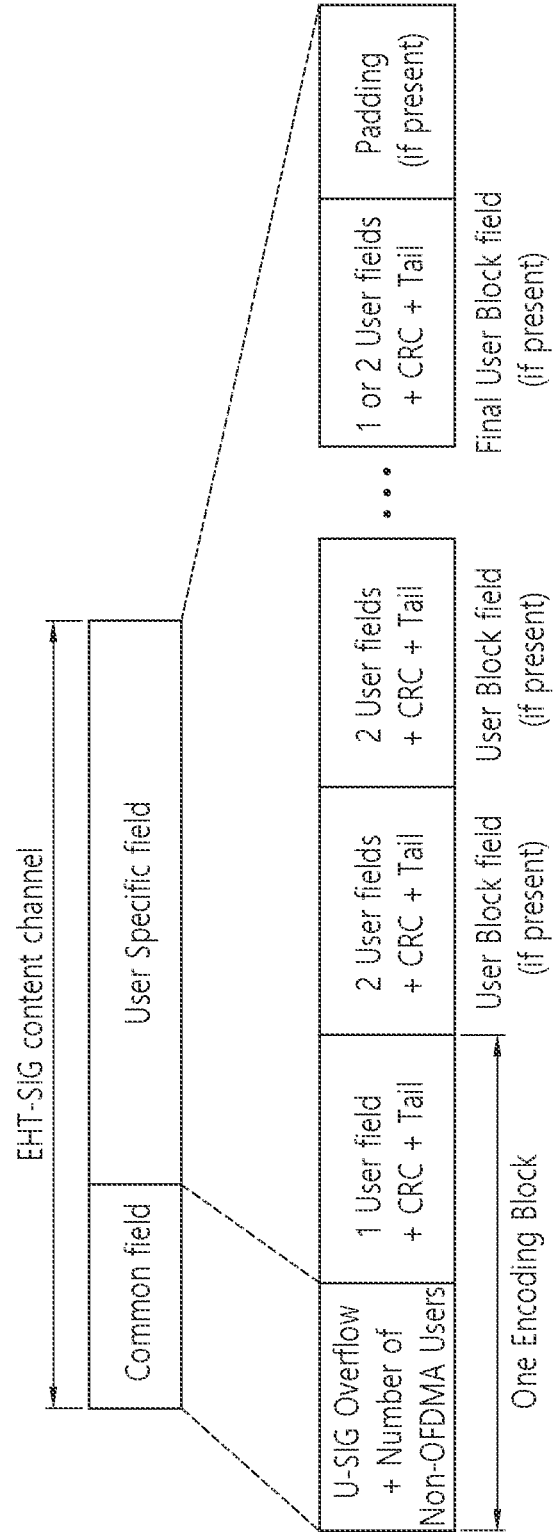
FIG. 22 is a diagram for explaining technical features of a PPDU based on MU-MIMO.

FIG. 22 is a diagram for explaining technical features of a PPDU based on MU-MIMO. For example, when the MU-MIMO mode is indicated through the 2-bit type field (or other control field), the EHT-SIG field may be configured based on the example of FIG. 22.

An example of FIG. 22 is an example of a common field and a user specific field included in one EHT-SIG content channel. As shown, the common field and the first user block field may consist of one encoding block (i.e., a BCC block). The common field may include the U-SIG overflow (i.e., overflowed information described above). In addition, the common field may include information related to the above-described non-OFDMA user(s). As shown, information related to a first user among a plurality of users related to the MU-MIMO may be encoded together with the common field. Also, information related to the remaining users may be encoded in units of two users.

For example, the receiving STA may determine the reception PPDU as a single user (SU) PPDU or a null data packet (NDP) PPDU based on the type field having a third value. For example, the third value may be '11' (or other preset value) shown in Table 17 above. Specific technical features related to the SU PPDU or NDP PPDU may be as follows.

Figure 23:
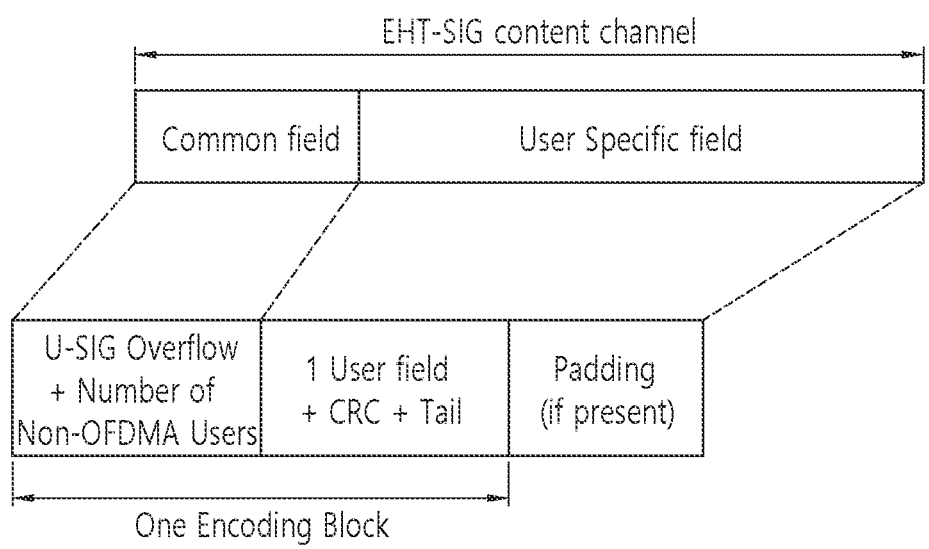
FIG. 23 is a diagram related to technical features of an SU-based PPDU.

FIG. 23 is a diagram related to technical features of an SU-based PPDU. For example, when the SU mode may be indicated through the 2-bit type field (or other control field), the EHT-SIG field may be configured based on the example of FIG. 23.

An example of FIG. 23 is an example of a common field and a user specific field included in one EHT-SIG content channel. As shown, the common field and the first user block field may consist of one encoding block (i.e., a BCC block). The common field may include the U-SIG overflow (i.e., overflowed information described above). In addition, the common field may include information related to the above-described non-OFDMA user(s). As shown, information related to one user related to SU communication may be encoded together with the common field.

Figure 24:
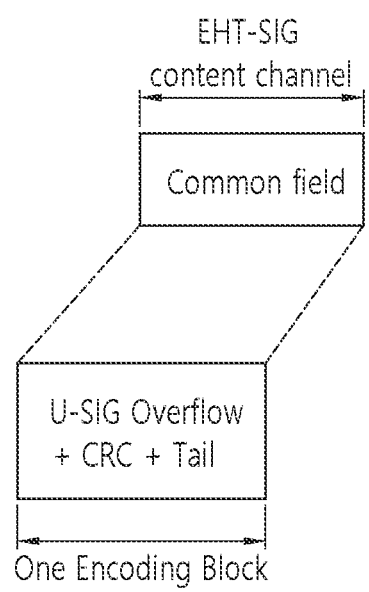
FIG. 24 is a diagram related to technical features of an NDP PPDU.

FIG. 24 is a diagram related to technical features of an NDP PPDU. For example, when the NDP mode is indicated through the 2-bit type field (or other control field), the EHT-SIG field may be configured based on the example of FIG. 24.

An example of FIG. 24 is an example of a common field included in one EHT-SIG content channel. As shown, the EHT-SIG field of the NDP PPDU may include only the common field and not the user specific field. The common field may configure one encoding block only with U-SIG overflow, CRC field, and Tail field.

As described in Table 16/17, etc., the EHT-SIG content channel may be configured in various ways according to the transmission mode. For example, as shown in Table 16/17, etc., in both OFDMA mode and MU-MIMO, the EHT-SIG content channel may be configured in the [1 2 1 2] structure. For example, one EHT-SIG Content Channel may have a 20 MHz bandwidth, and a plurality of EHT-SIG Contents may be transmitted/received at the same time and allocated to different frequency bands.

In addition, according to the [1 2 1 2] structure, EHT-SIG Content Channel 1 and EHT-SIG Content Channel 2 may be configured. For example, the 20 MHz PPDU may include only the EHT-SIG Content Channel 1, and the 40 MHz PPDU may include the EHT-SIG Content Channel 1 and the EHT-SIG Content Channel 2 being continuous thereto on the frequency band. In addition, on the 80 MHz PPDU, each content channel may be arranged in the order of EHT-SIG Content Channel 1, EHT-SIG Content Channel 2, EHT-SIG Content Channel 1, and EHT-SIG Content Channel 2. Even on the 160/320 MHz PPDU, content channels may be sequentially arranged according to the [1 2 1 2] structure.

In contrast, in the SU mode or the NDP mode, one EHT-SIG Content Channel is configured and may be duplicated according to the bandwidth of the PPDU. For example, when 40/80/160/320 MHz transmission/reception is performed, the EHT-SIG field may be included in such a way that one EHT-SIG content channel is included 2/4/8/16 times.

The operation of FIG. 20 may be performed by the apparatus of FIGS. 1 and/or 14. For example, the receiving STA may be implemented with the apparatus of FIGS. 1 and/or 14. The processor of FIGS. 1 and/or 14 may perform the above-described operation of FIG. 20. Also, the transceiver of FIGS. 1 and/or 14 may perform the transmission/reception operation described in FIG. 20.

Figure 25:
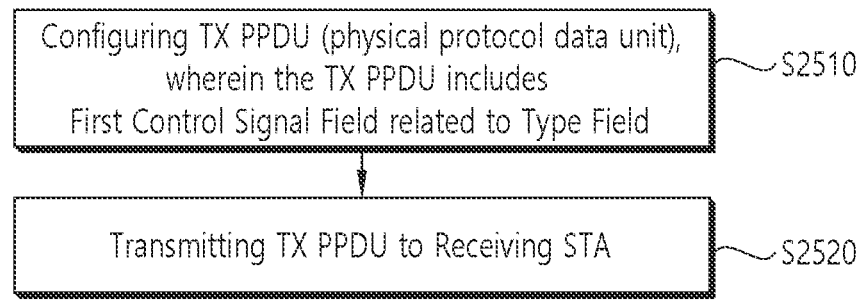
FIG. 25 is a flowchart illustrating an operation performed by a transmitting STA.

FIG. 25 is a flowchart illustrating an operation performed by a transmitting STA. As shown, the transmitting STA may configure a transmission physical protocol data unit (PPDU) (S2510). For example, the transmission PPDU may include a first control signal field for interpreting the transmission PPDU, a second control signal field including additional control information for the transmission PPDU, and a data field. For example, the first control signal field may include a type field having 2-bit information about the type of the transmission PPDU. For example, the transmission PPDU may be an extremely high throughput (EHT) PPDU, the first control signal field may be a Universal SIGNAL (U-SIG) field, and the second control signal field may be an EHT-SIG field.

The transmitting STA may configure the second bit information based on the transmission mode/type of the transmission PPDU. For example, the transmitting STA may set the type field to have a first value for the OFDMA-based transmission PPDU. For example, the transmitting STA may set the type field to have a second value for the MU-MIMO based transmission PPDU. For example, the transmitting STA may set the type field to have a second value for the SU PPDU or NDP PPDU-based transmission PPDU.

The technical features related to the OFDMA, MU-MIMO, SU PPDU, NDP PPDU, etc. may include, for example, the technical features of FIGS. 21 to 24.

As shown, the transmitting STA may transmit a transmission physical protocol data unit (PPDU) to the receiving STA (S2520).

The operation of FIG. 25 may be performed by the apparatus of FIGS. 1 and/or 14. For example, the transmitting STA may be implemented with the apparatus of FIGS. 1 and/or 14. The processor of FIGS. 1 and/or 14 may perform the above-described operation of FIG. 25. In addition, the transceiver of FIGS. 1 and/or 14 may perform the transmission/reception operation described in FIG. 25.

In addition, the apparatus (e.g., a transmitting STA and/or a receiving STA) proposed herein does not necessarily include a transceiver, and may be implemented in the form of a chip including a processor and a memory. Such a device may generate/store a transmission/reception PPDU according to the above-described example. Such a device may be connected to a separately manufactured transceiver to support actual transmission and reception.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

What is claimed is:

1. A method performed for in a wireless local area network, the method comprising:
    configuring, by a transmitting station (STA), a physical protocol data unit (PPDU), wherein the PPDU includes a first control signal field, a second control signal field, and a data field, wherein the first control signal field includes a type field having 2-bit information related to a type of the PPDU; and
    transmitting, by the transmitting STA, the PPDU to a receiving STA,
    wherein, based on the type field being a first value, the PPDU is set as an orthogonal frequency division multiple access (OFDMA) based PPDU,
    wherein, based on the type field being a second value, the PPDU is set as a multi-user multiple input multiple output (MU-MIMO) based PPDU,
    wherein, based on the type field being a third value, the PPDU is set as a single user (SU) PPDU or a null data packet (NDP) PPDU,
    wherein the first control signal field is configured based on two consecutive symbols, and each of the two consecutive symbols is used for 26-bit information, and
    wherein a common field of the second control signal field includes information overflowed from the first control signal field because of a restriction on a length of the first control signal field.

2. The method of claim 1, wherein the PPDU is an extremely high throughput (EHT) PPDU, the first control signal field is a universal signal (U-SIG) field, and the second control signal field is an EHT-SIG field.

3. The method of claim 1, wherein the first control signal field includes a 1-bit control field continuous to the type field, and the 1-bit control field includes one of control information related to a hybrid automatic repeat request (HARQ) technique applied to the PPDU and control information related to a Multi-Access Point (Multi-AP) transmission technique applied to the PPDU.

4. The method of claim 1, wherein the OFDMA based PPDU includes the common field and a user specific field, wherein the common field includes the information overflowed from the first control signal field, at least one resource unit (RU) allocation sub-field, a cyclic redundancy check (CRC) field, and a tail field, and
    wherein the information overflowed from the first control signal field, the at least one RU allocation sub-field, the CRC field, and the tail field are encoded together as one encoding block,
    wherein the MU-MIMO based PPDU includes the common field and a user specific field, wherein the common field includes the information overflowed from the first control signal field and information related to a number of a plurality of users, wherein the user specific field includes a first user field, a CRC field, and a tail field, and wherein the information overflowed from the first control signal field, the information related to the number of the plurality of users, the first user field, the CRC field, and the tail field are encoded together as one encoding block,
    wherein the SU PPDU includes the common field and a user specific field, wherein the common field includes the information overflowed from the first control signal field and information related to a number of a plurality of users, wherein the user specific field includes a first user field, a CRC field, and a tail field, and wherein the information overflowed from the first control signal field, the information related to the number of the plurality of users, the first user field, the CRC field, and the tail field are encoded together as one encoding block, and
    wherein the NDP PPDU includes the common field, and does not include a user specific field, wherein the common field includes the information overflowed from the first control signal field, a CRC field and a tail field, and wherein the information overflowed from the first control signal field, the CRC field and the tail field are encoded together as one encoding block.

5. A transmitting station (STA) configured to operate in a wireless local area network, the transmitting STA comprising:
   a transceiver configured to transmit and/or receive a wireless signal; and
   a processor configured to control the transceiver,
   wherein the processor is further configured to:
      configure a physical protocol data unit (PPDU), wherein the PPDU includes a first control signal field, a second control signal field, and a data field, and wherein the first control signal field includes a type field having 2-bit information related to a type of the PPDU; and
      transmit the PPDU to a receiving STA,
   wherein, based on the type field being a first value, the PPDU is set as an orthogonal frequency division multiple access (OFDMA) based PPDU,
   wherein, based on the type field being a second value, the PPDU is set as a multi-user multiple input multiple output (MU-MIMO) based PPDU,
   wherein, based on the type field being a third value, the PPDU is set as a single user (SU) PPDU or a null data packet (NDP) PPDU,
   wherein the first control signal field is configured based on two consecutive symbols, and each of the two consecutive symbols is used for 26-bit information, and
   wherein a common field of the second control signal field includes information overflowed from the first control signal field because of a restriction on a length of the first control signal field.

6. The STA of claim 5, wherein the PPDU is an extremely high throughput (EHT) PPDU, the first control signal field is a universal signal (U-SIG) field, and the second control signal field is an EHT-SIG field.

7. The STA of claim 5, wherein the first control signal field includes a 1-bit control field continuous to the type field, and the 1-bit control field includes one of control information related to a hybrid automatic repeat request (HARM) technique applied to the PPDU and control information related to a Multi-Access Point (Multi-AP) transmission technique applied to the PPDU.

8. The STA of claim 5, wherein the OFDMA based PPDU includes the common field and a user specific field, wherein the common field includes the information overflowed from the first control signal field, at least one resource unit (RU) allocation sub-field, a cyclic redundancy check (CRC) field, and a tail field, and wherein the information overflowed from the first control signal field, the at least one RU allocation sub-field, the CRC field, and the tail field are encoded together as one encoding block,
   wherein the MU-MIMO based PPDU includes the common field and a user specific field, wherein the common field includes the information overflowed from the first control signal field and information related to a number of a plurality of users, wherein the user specific field includes a first user field, a CRC field, and a tail field, and wherein the information overflowed from the first control signal field, the information related to the number of the plurality of users, the first user field, the CRC field, and the tail field are encoded together as one encoding block,
   wherein the SU PPDU includes the common field and a user specific field, wherein the common field includes the information overflowed from the first control signal field and information related to a number of a plurality of users, wherein the user specific field includes a first user field, a CRC field, and a tail field, and wherein the information overflowed from the first control signal field, the information related to the number of the plurality of users, the first user field, the CRC field, and the tail field are encoded together as one encoding block, and
   wherein the NDP PPDU includes the common field, and does not include a user specific field, wherein the common field includes the information overflowed from the first control signal field, a CRC field, and a tail field, and wherein the information overflowed from the first control signal field, the CRC field, and the tail field are encoded together as one encoding block.

* * * * *